US010202909B2

(12) United States Patent
Okazaki et al.

(10) Patent No.: US 10,202,909 B2
(45) Date of Patent: Feb. 12, 2019

(54) SPARK IGNITION TYPE INTERNAL COMBUSTION ENGINE

(75) Inventors: Shuntaro Okazaki, Sunto-gun (JP); Junichi Kako, Susono-shi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 777 days.

(21) Appl. No.: 13/202,340

(22) PCT Filed: Feb. 20, 2009

(86) PCT No.: PCT/JP2009/053622
§ 371 (c)(1),
(2), (4) Date: Sep. 16, 2011

(87) PCT Pub. No.: WO2010/095274
PCT Pub. Date: Aug. 26, 2010

(65) Prior Publication Data
US 2012/0004828 A1    Jan. 5, 2012

(51) Int. Cl.
F02D 28/00    (2006.01)
F01N 11/00    (2006.01)
(Continued)

(52) U.S. Cl.
CPC ......... *F02D 15/04* (2013.01); *F02D 13/0226* (2013.01); *F02D 41/1454* (2013.01);
(Continued)

(58) Field of Classification Search
CPC .. F02D 41/1475; F02D 41/1476; F02D 15/00; F02D 15/02; F02D 15/04
(Continued)

(56) References Cited

U.S. PATENT DOCUMENTS 5,195,469 A * 3/1993 Syed ........................... 123/48 A
5,983,878 A * 11/1999 Nonaka ................. F02B 61/045
123/679
(Continued)

FOREIGN PATENT DOCUMENTS

DE    603 04 551 T2    8/2006
JP    60230548 A   * 11/1985    ............. F02D 43/00
(Continued)

OTHER PUBLICATIONS

International Search Report dated Apr. 28, 2009 in PCT/JP09/053622 filed Feb. 20, 2009.

*Primary Examiner* — John Zaleskas
(74) *Attorney, Agent, or Firm* — Oblon, McClelland, Maier & Neustadt, L.L.P.

(57) ABSTRACT

The control system of an internal combustion engine of the present invention comprises an S/V ratio changing mechanism able to change an S/V ratio of a combustion chamber and a detection device having an output value changing in accordance with a hydrogen concentration in exhaust gas, which increases along with an increase in the S/V ratio, the internal combustion engine being controlled by the output value of the detection device. Further, the output value of the detection device or a parameter relating to operation of the internal combustion engine is corrected in accordance with the S/V ratio of the above S/V ratio changing mechanism. Due to this, even if the hydrogen concentration in the exhaust gas increases along with an increase in the S/V ratio, the internal combustion engine can be suitably controlled.

8 Claims, 15 Drawing Sheets

(51) Int. Cl.
*F02D 41/26* (2006.01)
*F02D 15/04* (2006.01)
*F02D 13/02* (2006.01)
*F02D 41/14* (2006.01)

(52) U.S. Cl.
CPC ......... *F02D 2041/147* (2013.01); *Y02T 10/12* (2013.01); *Y02T 10/18* (2013.01)

(58) Field of Classification Search
USPC ............ 123/48 R, 48 A, 48 AA, 48 B, 48 C, 123/48 D, 78 R, 78 A, 78 AA, 78 B, 123/78 BA, 78 C, 78 D, 78 E, 78 F, 123/90.15, 434, 672, 679, 681, 568.11, 123/568.21; 701/102–104
See application file for complete search history.

(56) References Cited

U.S. PATENT DOCUMENTS

| | | | | |
|---|---|---|---|---|
| 6,125,801 | A * | 10/2000 | Mendler | 123/48 R |
| 6,792,924 | B2 * | 9/2004 | Aoyama et al. | 123/568.14 |
| 7,096,663 | B2 * | 8/2006 | Mitsutani | F02D 41/0295 60/277 |
| 2001/0007192 | A1 * | 7/2001 | Suzuki | F01N 3/101 60/285 |
| 2002/0017467 | A1 | 2/2002 | Ando et al. | |
| 2002/0104492 | A1 * | 8/2002 | Cowans | 123/48 R |
| 2002/0104520 | A1 * | 8/2002 | Nakasaka | F01L 1/053 123/673 |
| 2002/0130053 | A1 | 9/2002 | Ando et al. | |
| 2002/0148422 | A1 * | 10/2002 | Shiraishi et al. | 123/90.15 |
| 2003/0042151 | A1 | 3/2003 | Ando et al. | |
| 2003/0111067 | A1 * | 6/2003 | Russell et al. | 123/685 |
| 2003/0115854 | A1 * | 6/2003 | Tamura | F01N 3/0814 60/277 |
| 2004/0050378 | A1 * | 3/2004 | Yamashita | F02D 41/1456 123/694 |
| 2004/0112310 | A1 * | 6/2004 | Osamura et al. | 123/48 B |
| 2004/0123818 | A1 * | 7/2004 | Sugiyama et al. | 123/48 B |
| 2004/0134464 | A1 * | 7/2004 | Mogi | 123/406.12 |
| 2004/0194737 | A1 * | 10/2004 | Miyashita | 123/48 C |
| 2005/0056240 | A1 * | 3/2005 | Sugiyama et al. | 123/78 E |
| 2005/0087155 | A1 * | 4/2005 | Kikori | 123/78 C |
| 2005/0284139 | A1 * | 12/2005 | Verkiel et al. | 60/297 |
| 2006/0070605 | A1 * | 4/2006 | Akihisa et al. | 123/478 |
| 2007/0215126 | A1 * | 9/2007 | Shiraishi et al. | 123/568.14 |
| 2008/0306676 | A1 * | 12/2008 | Akihisa et al. | 701/104 |
| 2009/0173323 | A1 * | 7/2009 | Ishii | F02D 41/064 123/685 |
| 2009/0187329 | A1 | 7/2009 | Akihisa et al. | |
| 2009/0217906 | A1 * | 9/2009 | Nishimoto et al. | 123/348 |

FOREIGN PATENT DOCUMENTS

| | | | | |
|---|---|---|---|---|
| JP | 60240837 A | * | 11/1985 | ............ F02D 15/04 |
| JP | 62142842 A | * | 6/1987 | ............ F02D 41/14 |
| JP | 2001 132498 | | 5/2001 | |
| JP | 2004 068607 | | 3/2004 | |
| JP | 2004076695 A | * | 3/2004 | ............ F02D 43/00 |
| JP | 2004 108373 | | 4/2004 | |
| JP | 2004232580 A | * | 8/2004 | ............ F02D 15/04 |
| JP | 2007231834 A | * | 9/2007 | |
| JP | 2007 278257 | | 10/2007 | |
| JP | 2007 303423 | | 11/2007 | |
| JP | 2008019873 A | * | 1/2008 | |
| JP | 2009 019589 | | 1/2009 | |
| WO | WO 2007132613 A2 | * | 11/2007 | ............ F02D 13/02 |
| WO | WO 2009007837 A2 | * | 1/2009 | ............ F02D 13/02 |

* cited by examiner

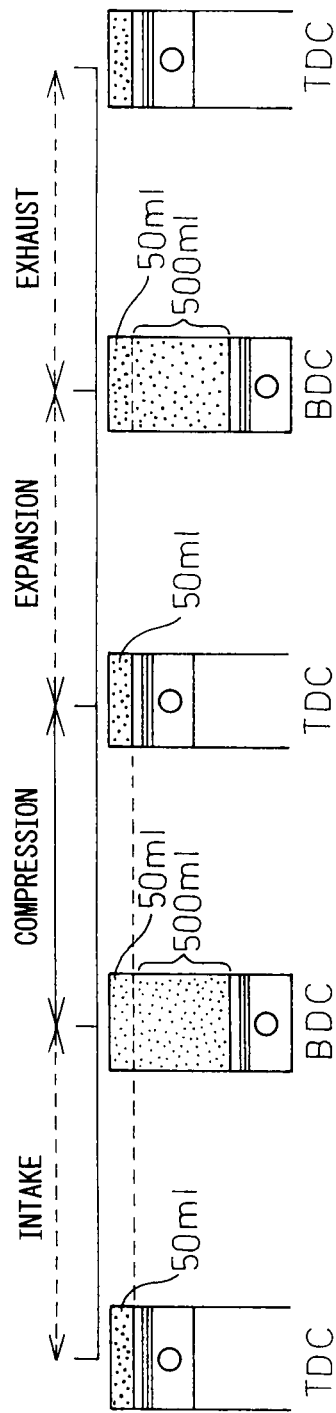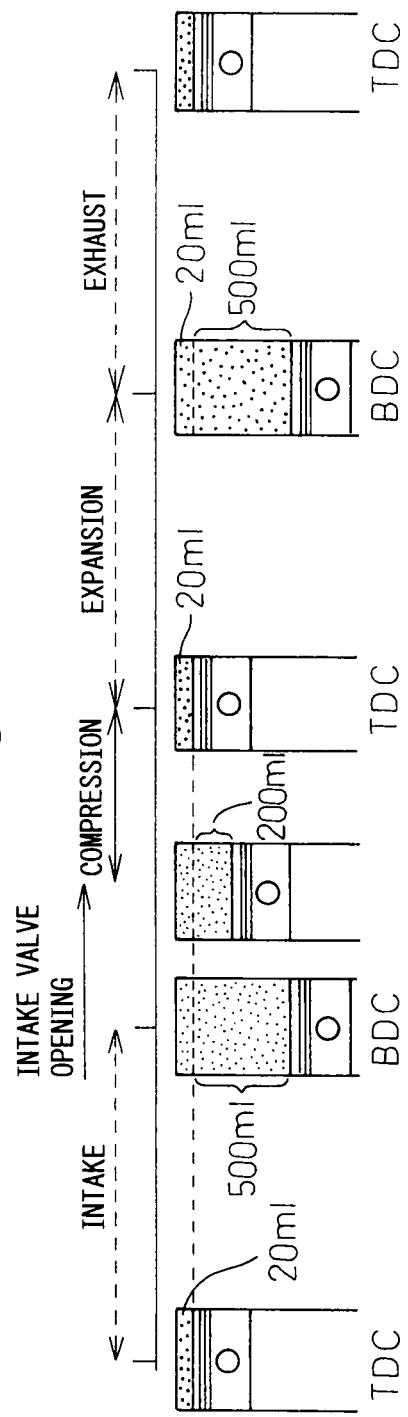

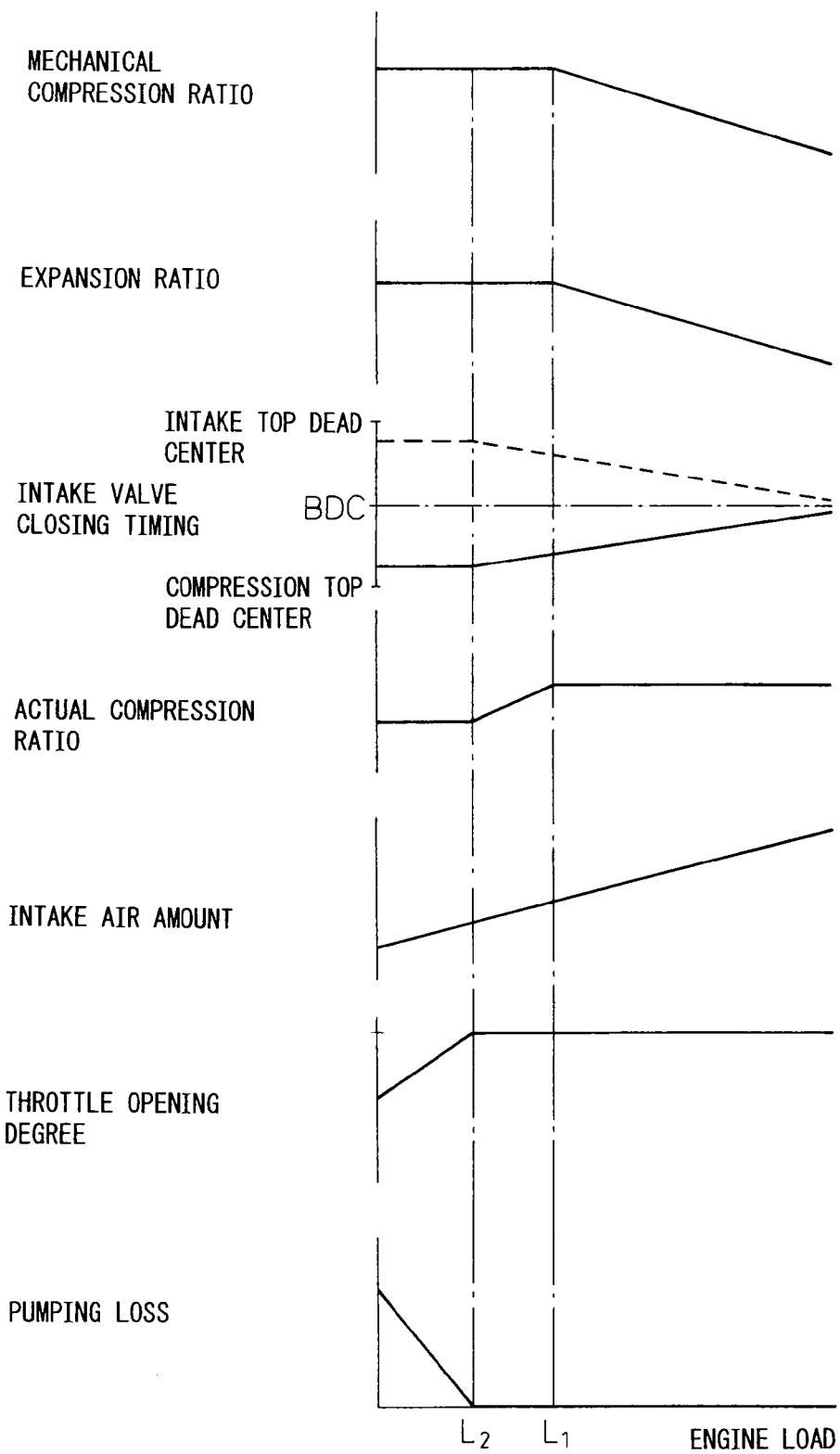

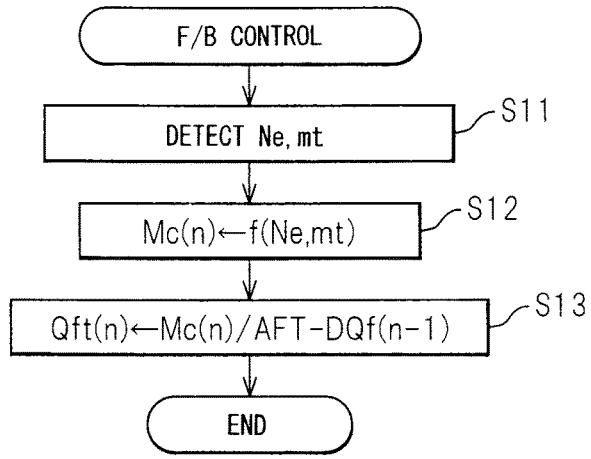
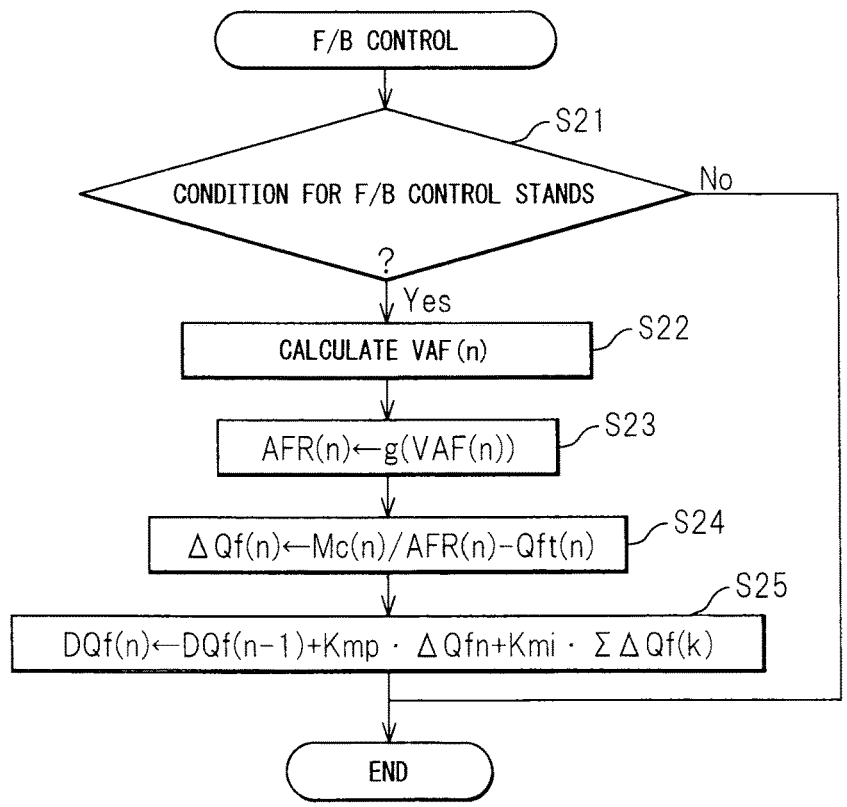

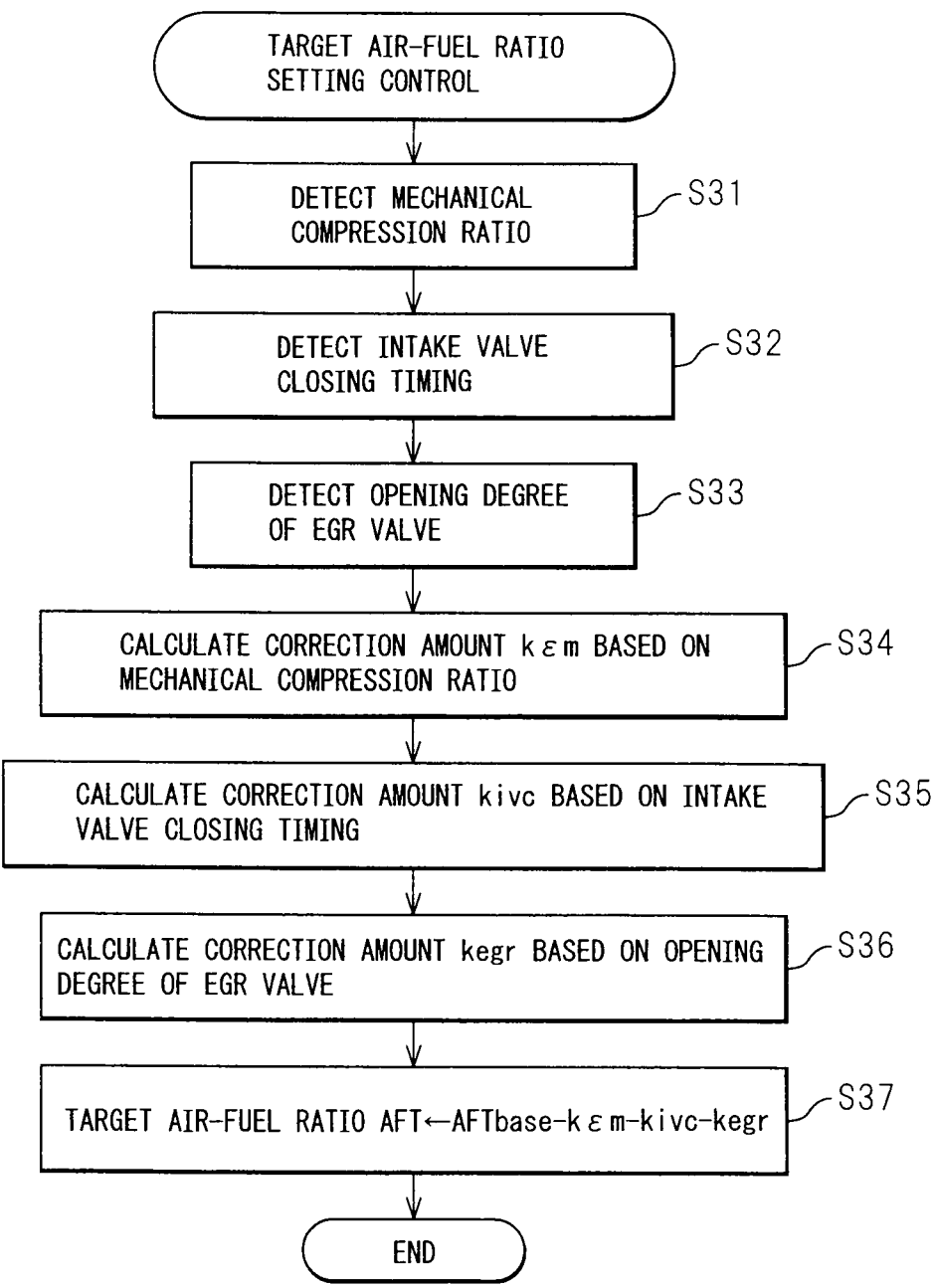

Fig.20
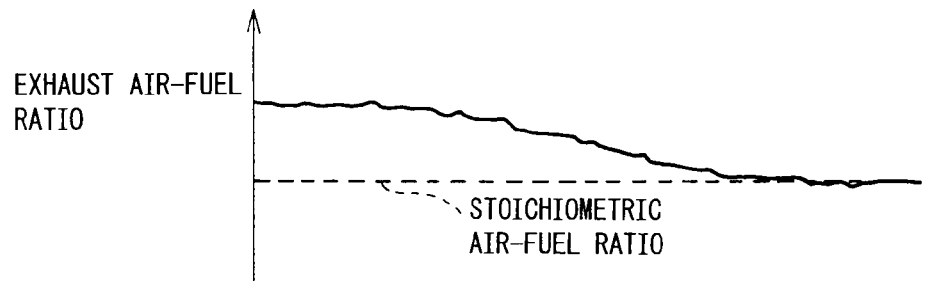
EXHAUST AIR-FUEL RATIO
STOICHIOMETRIC AIR-FUEL RATIO
OXYGEN SENSOR OUTPUT
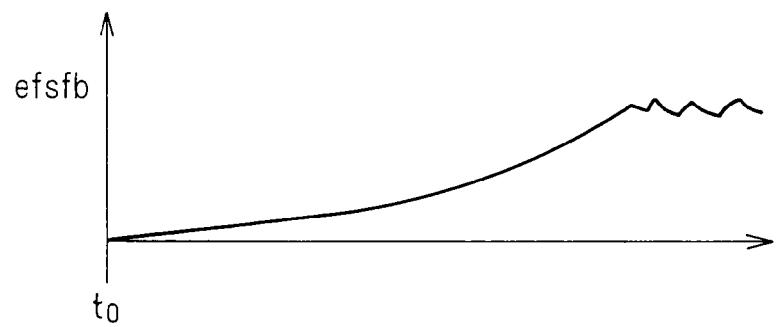
efsfb
$t_0$
Fig.21
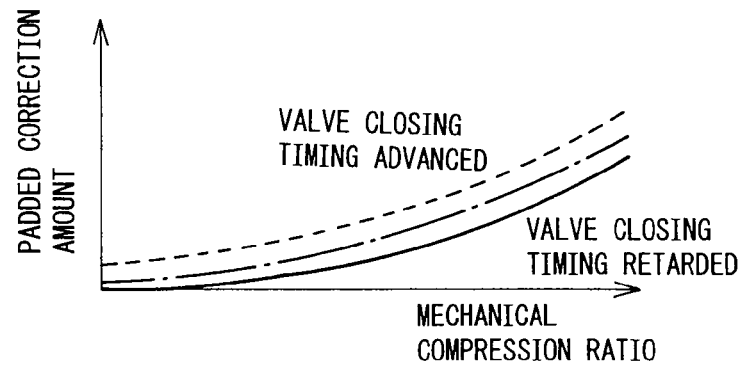
PADDED CORRECTION AMOUNT
VALVE CLOSING TIMING ADVANCED
VALVE CLOSING TIMING RETARDED
MECHANICAL COMPRESSION RATIO

SPARK IGNITION TYPE INTERNAL COMBUSTION ENGINE

TECHNICAL FIELD

The present invention relates to a control system of an internal combustion engine.

BACKGROUND ART

The applicant proposed in Japanese Patent Publication (A) No. 2007-303423 a spark ignition type internal combustion engine, comprising a variable compression ratio mechanism able to change a mechanical compression ratio and a variable valve timing mechanism able to change a closing timing of the intake valve, wherein the mechanism compression ratio is raised at the time of engine low load operation compared with engine high load operation, to make an expansion ratio 20 or more.

In such a spark ignition type internal combustion engine, at the time of engine low load operation, the mechanical compression ratio (expansion ratio) is made 20 or more and the closing timing of the intake valve is made a timing away from intake bottom dead center so as to maintain the actual compression ratio relatively low compared with mechanical compression ratio, to suppress the occurrence of knocking due to the actual compression ratio becoming higher, and while doing so realize an extremely high heat efficiency.

In this regard, when using a variable compression ratio mechanism such as described in Japanese Patent Publication (A) No. 2007-303423, the higher the mechanical compression ratio, the smaller the volume of a combustion chamber when the piston is at top dead center, therefore the larger the surface-volume ratio (ratio of the surface area and volume of a combustion chamber, hereinafter referred to as "the S/V ratio"). If the S/V ratio becomes larger in this way, the quench region (region near the wall surfaces of a combustion chamber etc. which flame cannot reach) becomes relatively larger. The HC in the air-fuel mixture which was included in this quench region will not burn since even if the air-fuel mixture in the combustion chamber burns, the flame will not reach it. On the other hand, the HC in the air-fuel mixture which was included in this quench region is exposed to a high temperature along with combustion of the air-fuel mixture, so part is converted to hydrogen ($H_2$). That is, if using a variable compression ratio mechanism to raise the mechanical compression ratio, the S/V ratio will increase and therefore the $H_2$ in the exhaust gas will increase.

On the other hand, in many internal combustion engines, for the purpose of increasing the efficiency of combustion and improving exhaust emissions, the air-fuel ratio of an air-fuel mixture which is fed into a combustion chamber is maintained at a target air-fuel ratio (for example, stoichiometric air-fuel ratio) by using an oxygen sensor or an air-fuel ratio sensor. However, an oxygen sensor and air-fuel ratio sensor are highly sensitive to $H_2$. If the amount of $H_2$ generated increases, the output value tends to deviate to the rich side.

In particular, in the above-mentioned type of spark ignition type internal combustion engine where the mechanical compression ratio becomes 20 or more, the S/V ratio becomes extremely large and along with this the amount of $H_2$ which is exhausted from a combustion chamber also becomes large. For this reason, the output value of the oxygen sensor or air-fuel ratio sensor greatly deviate to the rich side to an extent which cannot be ignored, and the oxygen concentration etc. in the exhaust gas can no longer be accurately detected. As a result, the air-fuel ratio can no longer be suitably controlled and deterioration of the combustion efficiency or deterioration of the exhaust emission is invited in some cases.

DISCLOSURE OF INVENTION

Therefore, in consideration of the above problems, an object of the present invention is to provide a control system of an internal combustion engine which enables suitable control of the internal combustion engine even if the hydrogen concentration in exhaust gas increases along with an increase in the S/V ratio.

The present invention provides, as means for solving this problem, a spark ignition type internal combustion engine described in the claims.

In a first aspect of the present invention, there is provided a control system of an internal combustion engine comprising an S/V ratio changing mechanism able to change an S/V ratio of a combustion chamber and a detection device having an output value changing in accordance with a hydrogen concentration in exhaust gas, which increases along with an increase in the S/V ratio, the internal combustion engine being controlled by the output value of the detection device, wherein the output value of the detection device or a parameter relating to operation of the internal combustion engine is corrected in accordance with the S/V ratio of the above S/V ratio changing mechanism.

In a second aspect of the present invention, the output value of the detection device or parameter relating to operation of the internal combustion engine is corrected so that the effect of the hydrogen concentration in the exhaust gas, which increases along with an increase in the S/V ratio, becomes smaller.

In a third aspect of the present invention, the above detection device is a device which detects a concentration of a specific ingredient in the exhaust gas other than hydrogen, and the concentration of the specific ingredient which was detected by the above detection device is corrected in accordance with the S/V ratio of the S/V ratio changing mechanism.

In a fourth aspect of the present invention, the above detection device is a device which detects a concentration of a specific ingredient in the exhaust gas other than hydrogen, and a parameter relating to operation of the internal combustion engine is corrected in accordance with the S/V ratio of the S/V ratio changing mechanism.

In a fifth aspect of the present invention, the above detection device is an oxygen sensor or air-fuel ratio sensor which detects an oxygen concentration in the exhaust gas or air-fuel ratio.

In a sixth aspect of the present invention, the parameter relating to operation of the internal combustion engine is a target air-fuel ratio.

In a seventh aspect of the present invention, the above detection device is an $NO_X$ sensor which detects an $NO_X$ concentration in the exhaust gas.

In an eighth aspect of the present invention, the system further comprises a variable valve timing mechanism which is able to control a closing timing of the intake valve, wherein the output value of the detection device or the parameter relating to operation of the internal combustion engine is corrected in accordance with not only the S/V ratio of the S/V ratio changing mechanism, but also the closing timing of the intake valve.

In a ninth aspect of the present invention, the system further comprises an EGR passage which connects an engine intake passage and an engine exhaust passage, and an EGR valve which opens and closes the EGR passage, wherein the output value of the detection device or the parameter relating to operation of the internal combustion engine is corrected in accordance with not only the S/V ratio of the S/V ratio changing mechanism, but also the opening degree of the EGR valve.

In a 10th aspect of the present invention, the system further comprises an exhaust purification catalyst which is arranged in an engine exhaust passage, wherein the above detection device has an upstream side oxygen sensor or air-fuel ratio sensor which is arranged at an upstream side of the above exhaust purification catalyst and a downstream side oxygen sensor or air-fuel ratio sensor which is arranged at a downstream side of the exhaust purification catalyst, the amount of feed of fuel is controlled based on the output value of the upstream side oxygen sensor or air-fuel ratio sensor so that the exhaust air-fuel ratio becomes the target air-fuel ratio, when the output value of the upstream side oxygen sensor or air-fuel ratio sensor deviates from the actual exhaust air-fuel ratio, the output value of the upstream side oxygen sensor or air-fuel ratio sensor or the amount of fuel feed is corrected based on the output value of the downstream side oxygen sensor or air-fuel ratio sensor, and the amount of correction of the output value of the upstream side oxygen sensor or air-fuel ratio sensor or the amount of fuel based on the output value of the downstream side oxygen sensor or air-fuel ratio sensor is corrected in accordance with the S/V ratio of the S/V ratio changing mechanism.

In an 11th aspect of the present invention, the above S/V ratio changing mechanism is a variable compression ratio mechanism which can change the mechanical compression ratio.

In a 12th aspect of the present invention, the system further comprises a variable valve timing mechanism which can control the closing timing of the intake valve, wherein the amount of intake air which is fed into a combustion chamber is mainly controlled by changing the closing timing of the intake valve, and the mechanical compression ratio is made higher at the time of engine low load operation compared with the time of engine high load operation.

In a 13th aspect of the present invention, at the time of engine low load operation, the mechanical compression ratio is made the maximum mechanical compression ratio.

In a 14th aspect of the present invention, at the time of engine low load operation, the expansion ratio is made 20 or more.

Below, the present invention will be able to be understood more sufficiently from the attached drawings and the description of the preferred embodiments of the present invention.

BRIEF DESCRIPTION OF THE DRAWINGS

FIG. 8A and FIG. 8B are views for explaining an ordinary cycle and a superhigh expansion ratio cycle.

FIG. 9 is a view showing changes in the mechanical compression ratio etc. in accordance with the engine load.

FIG. 10 is a flowchart showing a control routine of control for calculating a target fuel feed rate from a fuel injector.

FIG. 11 is a flowchart showing a control routine of F/B control for calculating a fuel correction amount.

FIG. 15 is a flowchart showing a control routine of control for setting a target air-fuel ratio.

FIG. 20 is a time chart of the actual exhaust air-fuel ratio, the output value of the oxygen sensor, and the output correction value of the air-fuel ratio sensor.

FIG. 21 is a view showing the relationship between the mechanical compression ratio and a padding correction value.

BEST MODE FOR CARRYING OUT THE INVENTION

Figure 1:
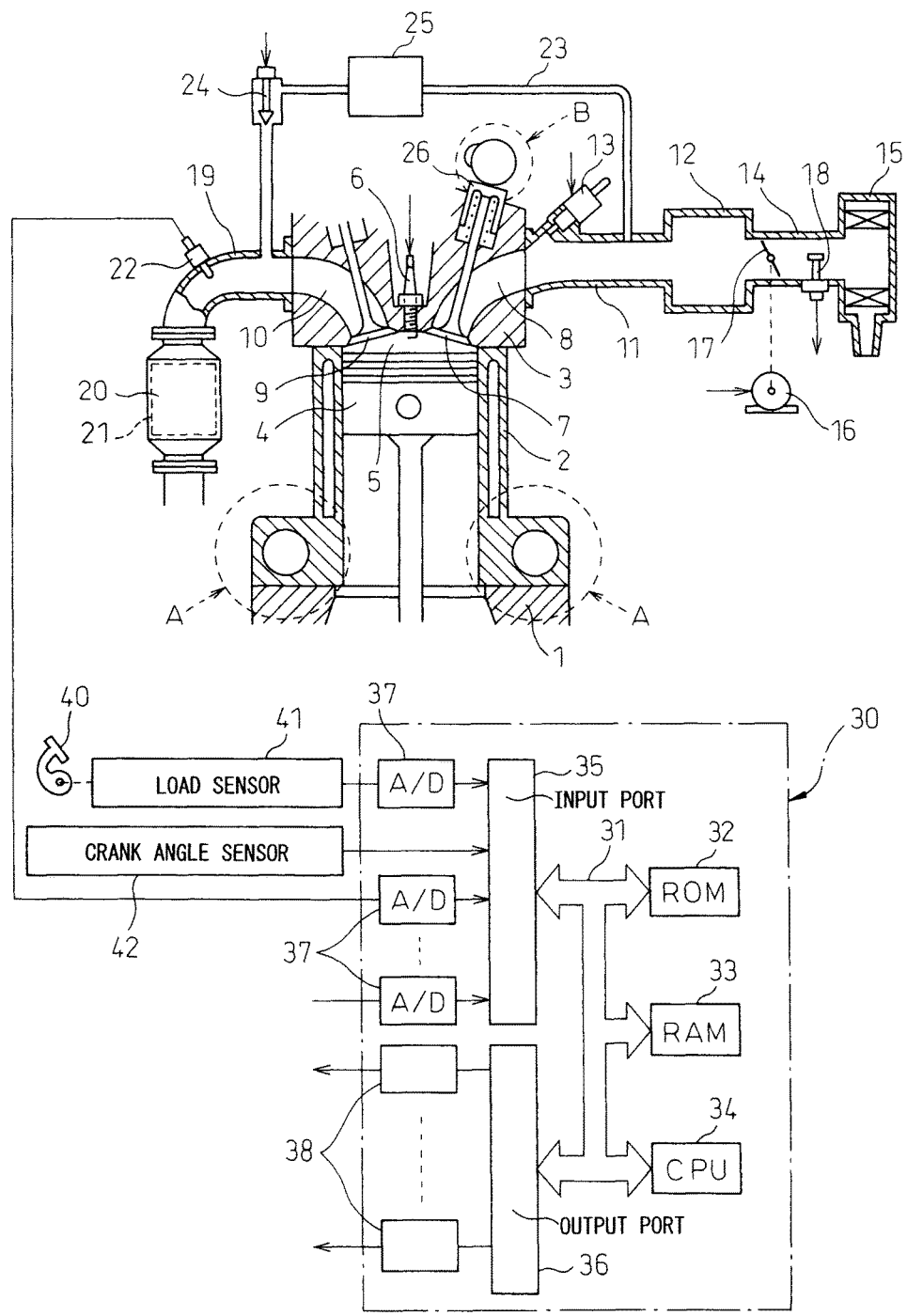
FIG. 1 is an overview of a spark ignition type internal combustion engine.

Below, embodiments of the present invention will be explained with reference to the drawings. Note that the same or similar components in the drawings are assigned the same notations.

FIG. 1 is a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15. The intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst 21, and the exhaust manifold 19 is provided inside it with an air-fuel ratio sensor 22.

The exhaust manifold 19 and the intake branch tube 11 (or the intake port 8, surge tank 12) are connected with each other through an EGR passage 23 for recirculated exhaust gas (below, referred to as "EGR gas"). Inside this EGR passage 23, an EGR control valve 24 is arranged. Further, around the EGR passage 23, an EGR cooling device 25 for cooling the EGR gas flowing through the inside of the EGR passage 23 is arranged. In the internal combustion engine shown in FIG. 1, engine coolant is led into the EGR cooling device 25, and the engine coolant is used to cool the EGR gas. Note that, in the following explanation, the intake port 8, intake branch tube 11, surge tank 12, and intake duct 14 are referred to all together as the "engine intake passage".

On the other hand, in the embodiment shown in FIG. 1, at a connecting part of the crank case 1 and cylinder block 2, a variable compression ratio mechanism A is provided which can change a relative position of the crank case 1 and cylinder block 2 in the cylinder axial direction so as to change the volume of a combustion chamber 5 when a piston 4 is positioned at compression top dead center. Furthermore, a variable valve timing mechanism B is provided which can change a closing timing of an intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 22 are input through corresponding AD converters 37 to the input port 35. Further, the accelerator pedal 40 is connected to a load sensor 41 generating an output voltage proportional to the amount of depression of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the corresponding drive circuits 38 to a spark plug 6, fuel injector 13, throttle valve drive actuator 16, EGR control valve 24, and variable compression ratio mechanism A and variable valve timing mechanism B.

Figure 2:
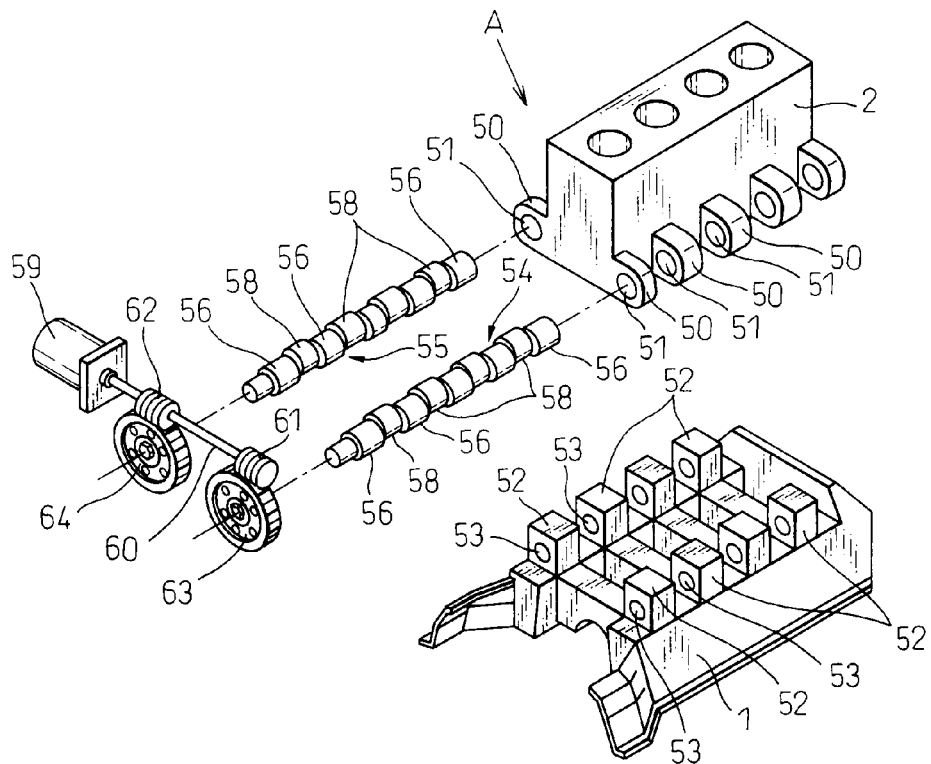
FIG. 2 is a disassembled perspective view of a variable compression ratio mechanism.
Figures 3A, 3B:
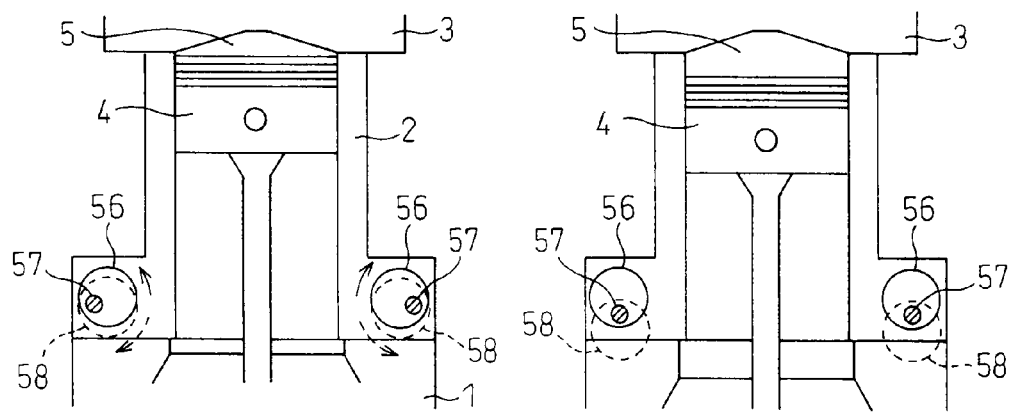
FIG. 3A and FIG. 3B are side cross-sectional views of a schematically illustrated internal combustion engine.

FIG. 2 is an exploded perspective view of the variable compression ratio mechanism A shown in FIG. 1, while FIG. 3A and FIG. 3B are side cross-sectional views of the internal combustion engine schematically illustrated. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3A and FIG. 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
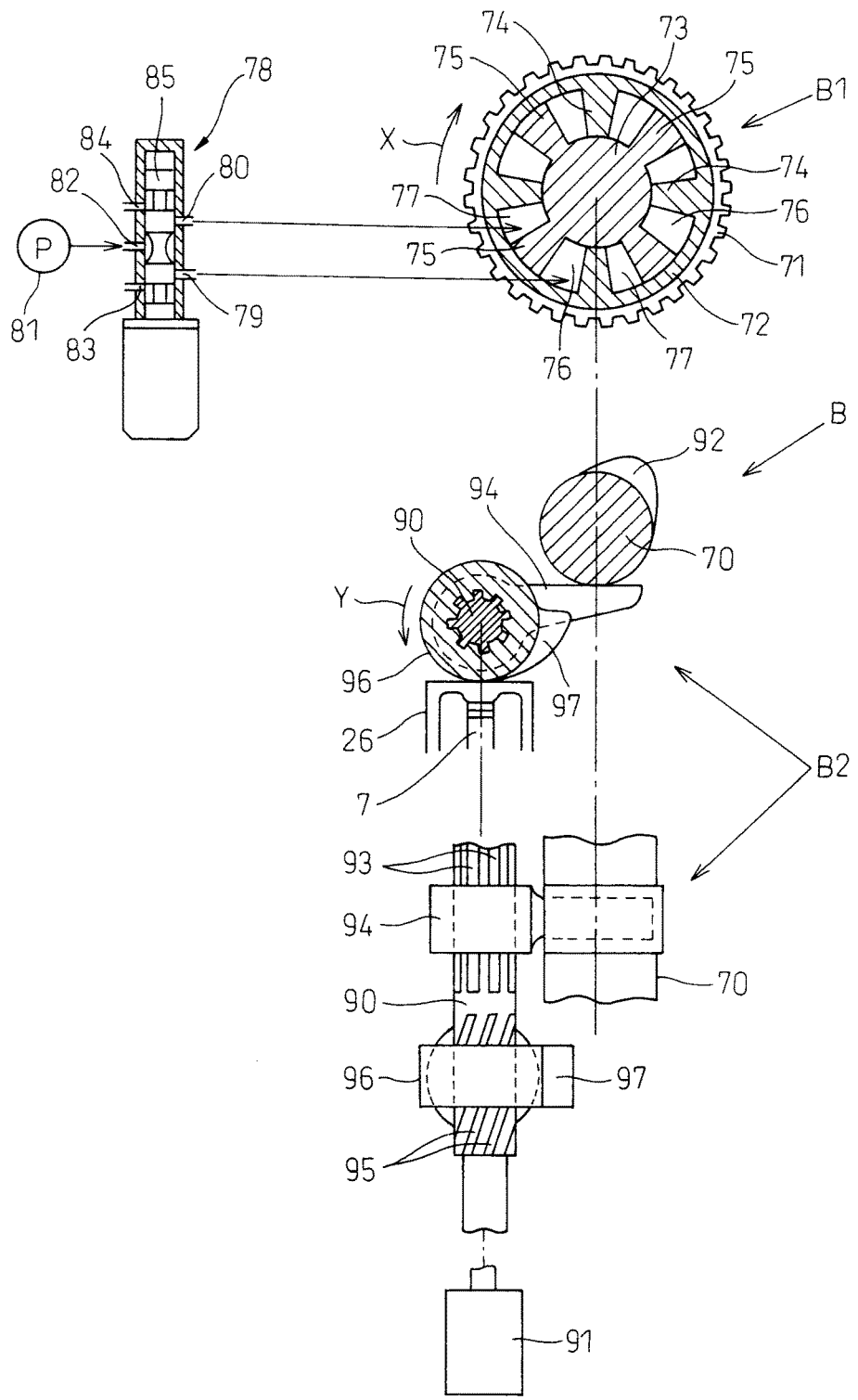
FIG. 4 is a view showing a variable valve timing mechanism.

On the other hand, further, FIG. 4 shows an intake valve variable mechanism B attached to the cam shaft 70 for driving the intake valve 7 in FIG. 1. As shown in FIG. 4, the intake variable valve mechanism B is comprised of a cam phase changer B1 attached to one end of the cam shaft 70 and changing the phase of the cam of the cam shaft 70, and a cam actuation angle changer B2 arranged between the cam shaft 70 and the valve lifter 26 of the intake valve 7 and changing the actuation angle (working angle) of the cams of the cam shaft 70 to different actuation angles for transmission to the intake valve 7. Note that FIG. 4 is a side sectional view and plan view of the cam actuation angle changer B2.

First, explaining the cam phase changer B1 of the intake variable valve mechanism B, this cam phase changer B1 is provided with a timing pulley 71 made to rotate by an engine crank shaft through a timing belt in the arrow direction, a cylindrical housing 72 rotating together with the timing pulley 71, a rotation shaft 73 able to rotate together with a cam shaft 70 and rotate relative to the cylindrical housing 72, a plurality of partitions 74 extending from an inside circumference of the cylindrical housing 72 to an outside circumference of the rotation shaft 73, and vanes 75 extending between the partitions 74 from the outside circumference of the rotation shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for feeding working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, the spool valve 85 is made to move to downward in FIG. 4, working oil fed from the feed port 82 is fed through the hydraulic port 79 to the advancing use hydraulic chambers 76, and working oil in the retarding use hydraulic chambers 77 is drained from the drain port 84. At this time, the rotation shaft 73 is made to rotate relative to the cylindrical housing 72 in the arrow X-direction.

As opposed to this, to retard the phase of the cam of the cam shaft 70, the spool valve 85 is made to move upward in FIG. 4, working oil fed from the feed port 82 is fed through the hydraulic port 80 to the retarding use hydraulic chambers 77, and working oil in the advancing use hydraulic chambers 76 is drained from the drain port 83. At this time, the rotation shaft 73 is made to rotate relative to the cylindrical housing 72 in the direction opposite to the arrows X.

Figure 5A:
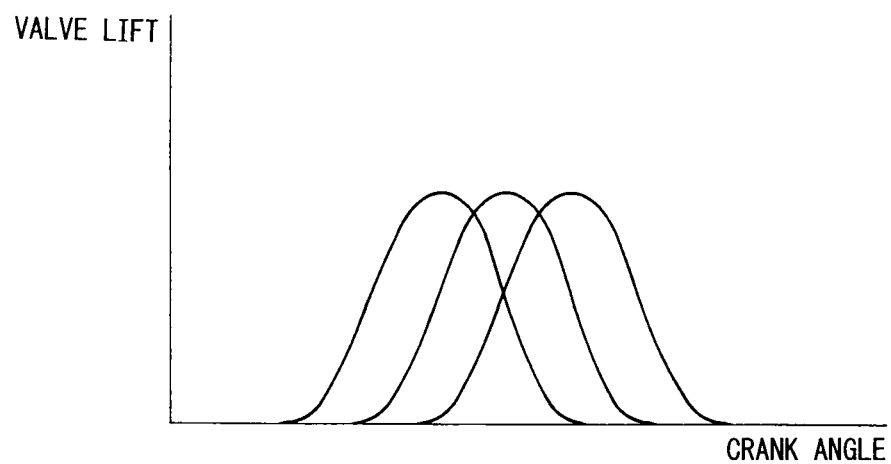
FIG. 5A and FIG. 5B are views showing lift amounts of an intake valve and exhaust valve.

When the rotation shaft 73 is made to rotate relative to the cylindrical housing 72, if the spool valve 85 is returned to the neutral position shown in FIG. 4, the operation for relative rotation of the rotation shaft 73 is ended, and the rotation shaft 73 is held at the relative rotational position at that time. Therefore, it is possible to use the cam phase changer B1 so as to advance or retard the phase of the cam of the cam shaft 70 by exactly the desired amount as shown in FIG. 5A. That is, the cam phase changer B1 can freely advance or retard the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidably fitting with a spline 93 formed on the control rod 90 and extending in the axial direction thereof, and a pivoting cam 96 engaging with a valve lifter 26 for driving the intake valve 7 and slidably fitting with a spline 95 extending in a spiral and formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 is also made to pivot by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 is made to rotate relative to the intermediate cam 94.

Figure 5B:
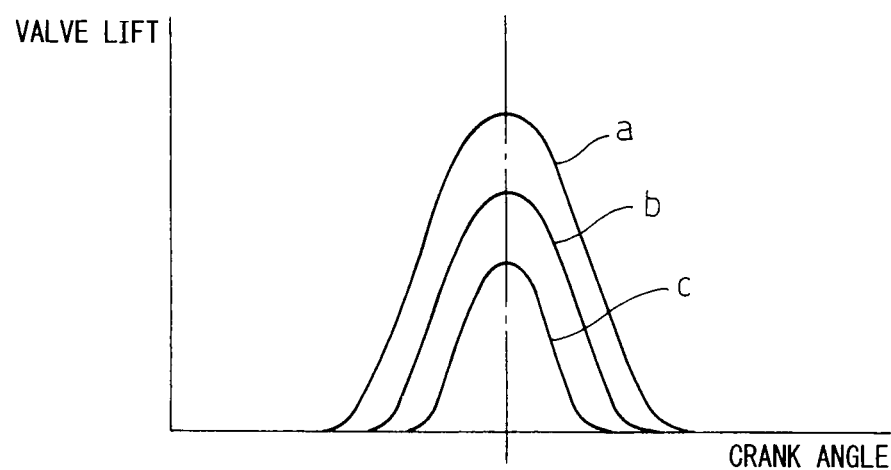

If the cam 97 of the pivoting cam 96 starts to engage the valve lifter 26 when the cam 92 of the cam shaft 70 starts to engage with the intermediate cam 94 due to the relative rotational positional relationship between the intermediate cam 94 and pivoting cam 96, as shown by a. in FIG. 5B, the opening time period and amount of lift of the intake valve 7 become maximum. As opposed to this, when the actuator 91 is used to make the pivoting cam 96 rotate relative to the intermediate cam 94 in the arrow Y-direction of FIG. 4, the cam 92 of the cam shaft 70 engages with the intermediate cam 94, then after a while the cam 97 of the pivoting cam 96 engages with the valve lifter 26. In this case, as shown by b in FIG. 5B, the opening time period and amount of lift of the intake valve 7 become smaller than a.

When the pivoting cam 96 is made to further rotate relative to the intermediate cam 94 in the arrow Y-direction of FIG. 4, as shown by c in FIG. 5B, the opening time period and amount of lift of the intake valve 7 become further smaller. That is, by using the actuator 91 to change the relative rotational position of the intermediate cam 94 and pivoting cam 96, the opening time period of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time period of the intake valve 7 in this way, so both the cam phase changer B1 and cam actuation angle changer B2, that is, the intake variable valve mechanism B, may be used to freely change the opening timing and opening time period of the intake valve 7, that is, the opening timing and closing timing of the intake valve 7.

Note that the intake variable valve mechanism B shown in FIGS. 1 and 4 shows an example. It is also possible to use various types of variable valve mechanism other than the example shown in FIGS. 1 and 4. In particular, in the embodiment according to the present invention, so long as a closing timing mechanism which can change the closing timing of an intake valve 7, any type of mechanism may be used. Further, for the exhaust valve 9 as well, a variable valve timing mechanism similar to the variable valve timing mechanism B of the intake valve 7 may be provided.

Figure 6A:
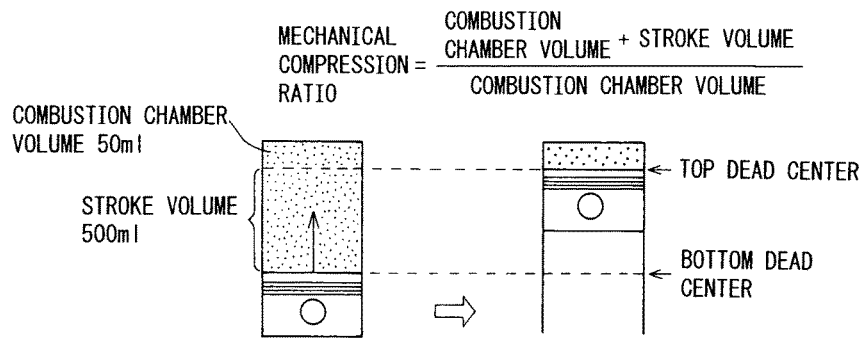
FIG. 6A to FIG. 6C are views for explaining a mechanical compression ratio, actual compression ratio, and expansion ratio.
Figure 6B:
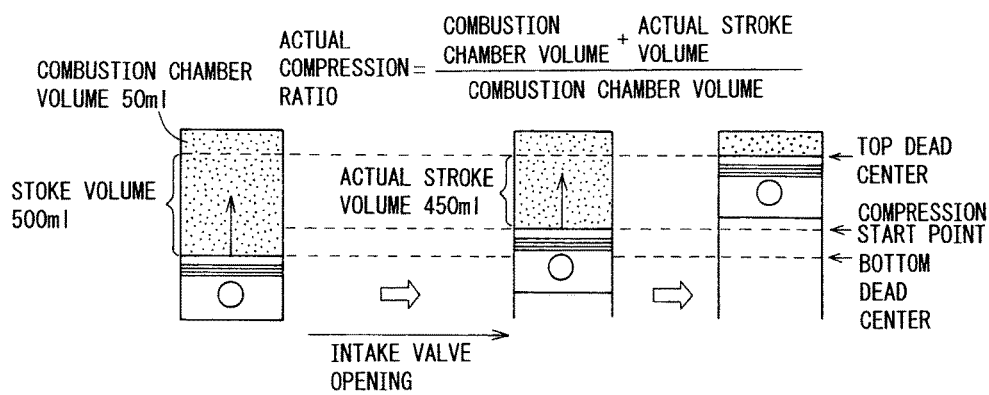
Figure 6C:
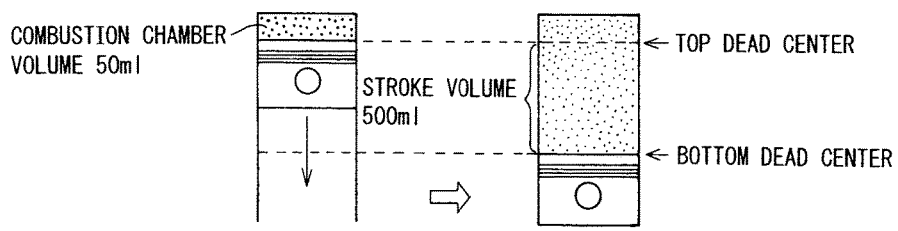

Next, the meaning of the terms used in the present application will be explained with reference to FIG. 6A to FIG. 6C. Note that FIG. 6A to FIG. 6C show for explanatory purposes an engine with a volume of the combustion chambers of 50 ml and a stroke volume of the piston of 500 ml. In these FIG. 6A to FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the combustion chamber volume and the actual stroke volume of the piston from when the compression action is actually started to when the piston reaches top dead center. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as above using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 7A, this expansion ratio becomes (50 ml+500 ml)/50 ml=11.

Next, the most basic features of the present invention will be explained with reference to FIG. 7, FIG. 8A and FIG. 8B. Note that FIG. 7 shows the relationship between the theoretical thermal efficiency and the expansion ratio, while FIG. 8A and FIG. 8B show a comparison between the ordinary cycle and superhigh expansion ratio cycle used selectively in accordance with the load in the present invention.

FIG. 8A shows the ordinary cycle wherein the intake valve closes near the bottom dead center and the compression action by the piston is started from near substantially compression bottom dead center. In the example shown in this FIG. 8A as well, in the same way as the examples shown in FIGS. 6A to 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
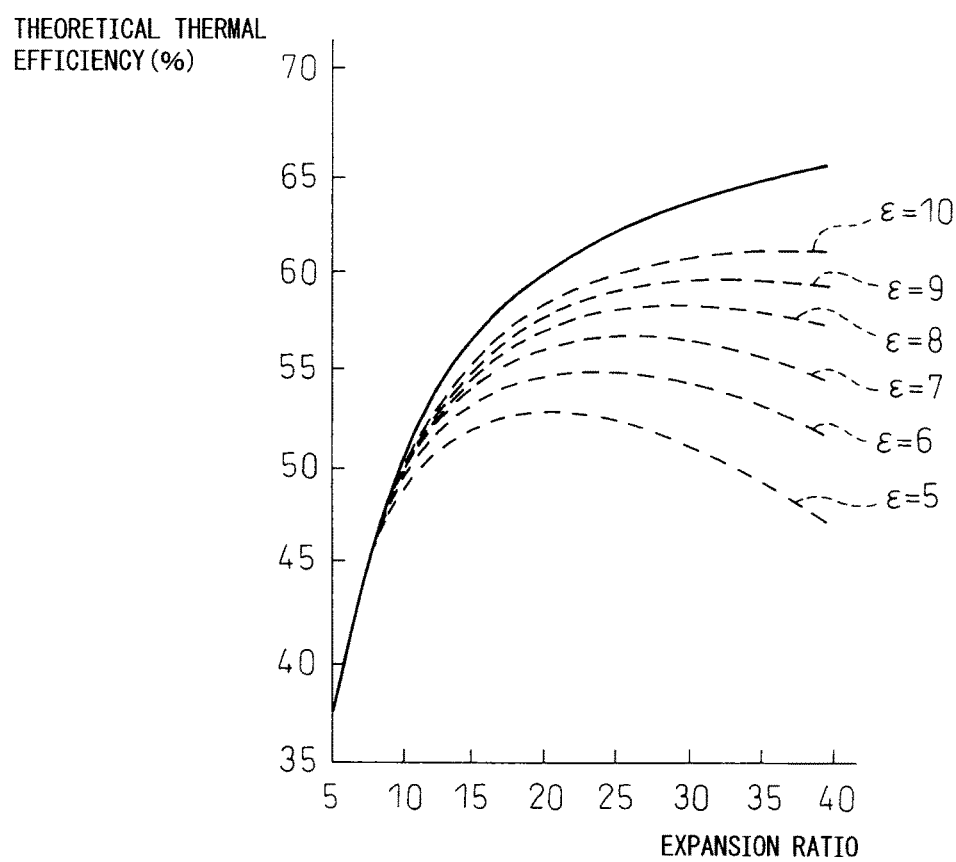
FIG. 7 is a view showing a relationship between a stoichiometric heat efficiency and expansion ratio.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, studying the theoretical thermal efficiency by strictly differentiating between the mechanical compression ratio and actual compression ratio, it is discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, and therefore the longer the time that the piston gives a rotational force to the crankshaft. Therefore, the larger the expansion ratio is made, the higher the theoretical thermal efficiency becomes. The broken line $\varepsilon=10$ in FIG. 7 shows the theoretical thermal efficiency in the case of fixing the actual compression ratio at 10 and raising the expansion ratio in that state. It is learned that the amount of rise of the theoretical thermal efficiency when raising the expansion ratio in the state where the actual compression ratio is maintained at a low value in the above way and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8B shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. Therefore, the cycle shown in FIG. 8B will be referred to the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set.

Next, the operational control as a whole will be explained while referring to FIG. 9.

FIG. 9 shows the various changes in parameters in accordance with the engine load at a certain engine speed such as the mechanical compression ratio, expansion ratio, the closing timing of the intake valve 7, the actual compression ratio, the amount of intake air, the opening degree of the throttle valve 17, and the pumping loss. Note that, in this embodiment according to the present invention, the average air-fuel ratio in the combustion chamber 5 is normally feedback controlled to the stoichiometric air-fuel ratio based on the output signal of the air-fuel ratio sensor 22 so that the three-way catalyst 21 in the catalytic converter 20 can simultaneously reduce the unburned hydrocarbons (unburned HC), carbon monoxide (CO), and nitrogen oxides ($NO_X$) in the exhaust gas.

Now then, as explained above, at the time of engine high load operation, the ordinary cycle shown in FIG. 8A is executed. Therefore, as shown in FIG. 9, at this time, the mechanical compression ratio is made lower, so the expansion ratio is low and, as shown by the solid line in FIG. 9, the closing timing of the intake valve 7 is advanced. Further, at this time, the amount of intake air is large. At this time, the opening degree of the throttle valve 17 is held at fully open or substantially fully open, so the pumping loss becomes zero.

On the other hand, as shown in FIG. 9 by the solid line, if the engine load becomes lower, along with this, the amount of intake air is reduced by the closing timing of the intake valve 7 being retarded. Further, at this time, the mechanical compression ratio is increased as the engine load becomes lower so that the actual compression ratio is held substantially constant, as shown in FIG. 9, and, therefore, as the engine load becomes lower, the expansion ratio is also increased. Note that, at this time as well, the throttle valve 17 is held at the fully open or substantially fully open state, therefore, the amount of intake air which is fed into a combustion chamber 5 is controlled not by relying on the throttle valve 17, but by changing the closing timing of the intake valve 7. At this time as well, the pumping loss becomes zero.

When the engine load becomes lower from the engine high load operation state in this way, under a substantially constant actual compression ratio, as the amount of intake air is decreased, the mechanical compression ratio is made to increase. That is, the volume of a combustion chamber 5 when the piston 4 reaches compression top dead center is reduced in proportion to the decrease in the amount of intake air. Therefore, the volume of the combustion chamber 5 when the piston 4 reaches compression top dead center changes proportionally to the amount of intake air. Note that, at this time, the air-fuel ratio in the combustion chamber 5 is the stoichiometric air-fuel ratio, so the volume of the combustion chamber 5 when the piston 4 reaches compression top dead center changes in proportion to the amount of fuel.

If the engine load becomes further lower, the mechanical compression ratio is made to further increase. If the engine load falls down to the medium load $L_1$ close to low load, the mechanical compression ratio reaches the limit mechanical compression ratio, which corresponds to the structural limit of a combustion chamber 5. If the mechanical compression ratio reaches the limit mechanical compression ratio, in the region of a load lower than the engine load $L_1$ when the mechanical compression ratio reaches the limit mechanical compression ratio, the mechanical compression ratio is held at the limit mechanical compression ratio. Therefore, at the time of low load side of engine medium load operation and at the time of engine low load operation, the mechanical compression ratio becomes maximum and the expansion ratio also becomes maximum. Explained in another way, at the time of low load side of engine medium load operation and at the time of engine low load operation, the mechanical compression ratio is made maximum so that the maximum expansion ratio is obtained.

On the other hand, in the embodiment shown in FIG. 9, even if the engine load becomes lower than $L_1$, as shown in FIG. 9 by the solid line, the closing timing of the intake valve 7 is retarded more as the engine load becomes lower. If the engine load falls to $L_2$, the closing timing of the intake valve 7 becomes the limit closing timing able to control the amount of intake air which is fed into the combustion chamber 5. If the closing timing of the intake valve 7 reaches the limit closing timing, in the region of a load lower than the engine load $L_2$ when the closing timing of the intake valve 7 reaches the limit closing timing, the closing timing of the intake valve 7 is held at the limit closing timing.

If the closing timing of the intake valve 7 is held at the limit closing timing, the amount of intake air can no longer be controlled by the change of the closing timing of the intake valve 7. In the embodiment shown in FIG. 9, at this time, that is, in the region of a load lower than the engine load $L_2$ when the closing timing of the intake valve 7 reaches the limit closing timing, the throttle valve 17 is used to control the amount of intake air which is fed into the combustion chamber 5. However, if using the throttle valve 17 to control the amount of intake air, as shown in FIG. 9, the pumping loss is increased.

Note that, to prevent such pumping loss from occurring, in the region of a load lower than the engine load $L_2$ when the closing timing of the intake valve 7 reaches the limit closing timing, it is also possible to increase the air-fuel ratio the more the engine load becomes lower in the state holding the throttle valve 17 fully open or substantially fully open. At this time, the fuel injector 13 is preferably arranged inside of the combustion chamber 5 to perform layered combustion. Alternatively, in the region of a load lower than the engine load $L_2$ when the closing timing of the intake valve 7 reaches the limit closing timing, it is possible to increase the opening degree of the EGR valve 24 the more, the lower the engine load in the state where the throttle valve 17 is held fully open or substantially fully open.

Further, in the region of a load lower than the engine load $L_1$ when the mechanical compression ratio reaches the limit mechanical compression ratio, it is not necessarily required to control the closing timing of the intake valve 7 and the opening degree of the throttle valve 17 as explained above. In this operating region, it is sufficient to control one or the other of the closing timing of the intake valve 7 and the opening degree of the throttle valve 17 so as to control the amount of intake air.

On the other hand, as shown in FIG. 9, when the engine load is higher than $L_1$, that is, at the time of high load side of engine medium load operation and at the time of engine high load operation, the actual compression ratio is maintained at substantially the same actual compression ratio for the same engine speed. As opposed to this, when the engine load is lower than $L_1$, that is, when the mechanical compression ratio is held at the limit mechanical compression ratio, the actual compression ratio is determined by the closing timing of the intake valve 7. If the closing timing of the intake valve 7 is retarded, the actual compression ratio falls, as understood from when the engine load is between $L_1$ and $L_2$. If the closing timing of the intake valve 7 is held at the limit closing timing, the actual compression ratio is held constant, as understood from when the engine load is in the operational region lower than $L_2$.

Note that, if the engine speed becomes higher, the air-fuel mixture in the combustion chamber 5 becomes disturbed and knocking becomes harder to occur. Therefore, in this embodiment according to the present invention, the higher the engine speed becomes, the higher the actual compression ratio is made.

On the other hand, as explained above, in the superhigh expansion ratio cycle shown in FIG. 8B, the expansion ratio is made 26. This expansion ratio is preferably as high as possible, but as will be understood from FIG. 7, even with respect to the actually feasible lower limit actual compression ratio $\varepsilon=5$, if 20 or more, a considerably high stoichiometric heat efficiency can be obtained. Therefore, in the present invention, the variable compression ratio mechanism A is formed so that the expansion ratio becomes 20 or more.

Further, in the example shown in FIG. 9, the mechanical compression ratio is made to change continuously in accordance with the engine load. However, the mechanical compression ratio may also be made to change in stages in accordance with the engine load.

On the other hand, as shown in FIG. 9 by the broken line, even if advancing the closing timing of the intake valve 7 as the engine load becomes lower, it is possible to control the amount of intake air without regard as to the throttle valve 17. Therefore, if expressed so as to include both the case shown in FIG. 9 by the solid line and the case shown by the broken line, in this embodiment according to the present invention, the closing timing of the intake valve 7 can be made to move in a direction away from compression bottom dead center up to the limit closing timing $L_2$ which can control the amount of intake air which is fed into a combustion chamber as the engine load becomes lower.

In this regard, in this embodiment according to the present invention, in the above-mentioned way, the average air-fuel ratio in the combustion chamber 5 is feedback controlled (hereinafter referred to as "F/B control") to the stoichiometric air-fuel ratio based on the output signal of the air-fuel ratio sensor 22 so that the unburned HC, CO and $NO_X$ in the exhaust gas can be simultaneously reduced by the three-way catalyst 21. That is, in the present embodiment, the exhaust air-fuel ratio (ratio of air and fuel fed to exhaust passage at upstream side of three-way catalyst 21, combustion chamber 5, and intake passage) is detected by the air-fuel ratio sensor 22 which is arranged at the exhaust upstream side from the three-way catalyst 21, and the output value of the air-fuel ratio sensor 22 is made to become a value corresponding to the stoichiometric air-fuel ratio by F/B control of the amount of feed of fuel from the fuel injector 13.

Below, F/B control will be explained in detail. First, in the present embodiment, the amount of fuel Qft(n) to be fed from a fuel injector 13 to a cylinder (below, called the "target fuel feed rate") is calculated by the following formula (1).

$$Qft(n)=Mc(n)/AFT+DQf(n-1) \quad (1)$$

Here, in the above formula (1), "n" is a value showing a number of times of calculation at the ECU 30. For example, Qft(n) shows the target fuel feed rate which is calculated by the n-th time of calculation (that is, at the time "n"). Further, Mc(n) shows the amount of air which is predicted to have been sucked into each cylinder up to the time of closing of the intake valve 7 (hereinafter referred to as the "in-cylinder intake air amount"). The in-cylinder intake air amount Mc(n) is calculated for example by finding a map or calculation formula, having the engine speed Ne and air flow rate mt which was detected by the intake air amount detector 18 as arguments, in advance by experiments or calculation, storing this map or calculation formula in the ROM 32 of the ECU 30, detecting the engine speed Ne and air flow rate mt during engine operation, and using these detection values as the basis for calculation using the above map or calculation formula. Further, AFT is the target air-fuel ratio, in the present embodiment, the stoichiometric air-fuel ratio. Furthermore, DQf is the fuel correction amount which is calculated relating to the later explained F/B control. At the fuel injector 13, an amount of fuel corresponding to the target fuel feed rate which was calculated in this way is injected.

Note that, in the above explanation, the in-cylinder intake air amount Mc(n) is calculated based on a map etc. having the engine speed Ne and the air flow rate mt as arguments, but for example it may also be found by other methods, such as a calculation formula based on the closing timing of the intake valve 7, the opening degree of the throttle valve 17, the atmospheric pressure.

FIG. 10 is a flowchart showing a control routine of target fuel feed rate calculation control which calculates a target fuel feed rate Qft(n) from a fuel injector 13. The control routine shown is performed by interruption at predetermined time intervals.

First, at step 11, the engine speed Ne and air flow rate mt are detected by the crank angle sensor 42 and the intake air amount detector 18. Next, at step 12, the in-cylinder intake air amount Mc(n) at the time "n" is calculated based on the engine speed Ne and intake passage air flow rate mt which were detected at step 11, by using a map or calculation formula. Next, at step 13, the target fuel feed rate Qft(n) is calculated by the above formula (1), based on the in-cylinder intake air amount Mc(n) which was calculated at step 12 and the fuel correction amount DQf(n−1) at the time n−1 which was calculated by the later explained F/B control, then the control routine is ended. At the fuel injector 13, an amount of fuel corresponding to the target fuel feed rate Qft(n) calculated in this way is injected.

Next, the F/B control will be explained. In the present embodiment, as the F/B control, a fuel difference ΔQf between the actual fuel feed amount which was calculated based on the output value of the air-fuel ratio sensor 22 and the above-mentioned target fuel feed rate Qft is calculated for each calculation time, then the fuel correction amount DQf is calculated so that this fuel difference ΔQf becomes zero. Specifically, the fuel correction amount DQf is calculated by the following formula (2). Note that, in the following formula (2), DQf(n−1) shows the fuel correction amount in the n−1-th calculation, that is, the previous calculation, Kmp shows a proportional gain, and Kmi shows an integral gain. These proportional gain Kmp and integral gain Kmi may be predetermined constant values or may be values which change in accordance with the engine operating state.

$$DQf(n) = DQf(n-1) + Kmp \cdot \Delta Qf(n) + Kmi \cdot \sum_{k=1}^{n} \Delta Qf(k) \quad (2)$$

FIG. 11 is a flowchart showing a control routine of F/B control for calculating the fuel correction amount DQf. The control routine shown is performed by interruption every predetermined time interval.

First, at step S21, it is judged if the condition for executing F/B control stands. As the case where the condition for executing F/B control stands, for example, the case where the internal combustion engine is not in the middle of a cold start (that is, the engine coolant temperature is a certain temperature or more and fuel is not being increased at the time of startup), the case where the injection of fuel from a fuel injector is not stopped during engine operation, that is, not during fuel cut control, etc. may be mentioned. When it is judged at step S21 that the condition for executing F/B control stands, the routine proceeds to step S22.

At step S22, the output value VAF(n) of the air-fuel ratio sensor 22 at the time of the n-th calculation is detected. Next, at step S23, the actual air-fuel ratio AFR(n) at the time "n" is calculated based on the output value VAF(n) which was detected at step 22. The thus calculated actual air-fuel ratio AFR(n) normally becomes a value substantially matching the actual air-fuel ratio of the exhaust gas which flows into the three-way catalyst 21 at the time of the n-th calculation.

Next, at step S24, the fuel difference ΔQf between the amount of fuel feed which was calculated based on the output value of the air-fuel ratio sensor 22 and the target fuel feed rate Qft is calculated by the following formula (3). Note that, in the following formula (3), for the in-cylinder intake air amount Mc and target fuel feed rate Qft, the values at the time of the n-th calculation are used, but the values before the n-th calculation may also be used.

$$\Delta Qf(n)=Mc(n)/AFR(n)-Qft(n) \quad (3)$$

At step S25, the fuel correction amount DQf(n) at the time "n" is calculated by the above formula (2), then the control routine is ended. The calculated fuel correction amount DQf(n) is used in the above formula (1) for calculating the target fuel feed rate. On the other hand, when it is judged at step S21 that the condition for F/B control does not stand, the control routine is ended without the fuel correction amount DQf(n) being changed.

Note that, in the above embodiment, as the F/B control to the stoichiometric air-fuel ratio based on the output signal of the air-fuel ratio sensor 22, the case of performing PI control is shown, but the F/B control is not limited to the above control. Various controls may be performed.

In this regard, when using such a variable compression ratio mechanism A, the higher the mechanical compression ratio, the smaller the volume of the combustion chamber at the time when the piston is positioned at compression top dead center and, as a result, the larger the surface-volume ratio (ratio of surface area and volume of combustion chamber 5 when piston is positioned at compression top dead center. Below, referred to as "the S/V ratio"). If the S/V ratio becomes larger in this way, the quench region in the combustion chamber 5 as a whole (region near wall surfaces of combustion chamber etc. where flame does not reach) becomes relatively large. The HC which is included in the air-fuel mixture in this quench region basically will not burn since the flame will not reach it even if the air-fuel mixture inside of the combustion chamber 5 burns. Therefore, if the mechanical compression ratio becomes higher and the S/V ratio increases, the amount of HC which is difficult to burn even if combustion of the air-fuel mixture occurs in the combustion chamber 5, relatively increases.

On the other hand, if the air-fuel mixture in the combustion chamber 5 burns, the inside of the combustion chamber 5 becomes a high temperature. If the HC in the quench region is exposed to a high temperature in this way, part will be converted to hydrogen ($H_2$). This $H_2$ is then exhausted from the combustion chamber 5 without being burned in the combustion chamber 5. Therefore, if using the variable compression ratio mechanism A to increase the mechanical compression ratio, the S/V ratio will increase and as a result the amount of the $H_2$ which is contained in the exhaust gas will increase. In particular, in the present embodiment, the mechanical compression ratio is made a high compression ratio of 20 or higher, so compared with a normal internal combustion engine (internal combustion engine where the mechanical compression ratio is controlled to 12 or so), the S/V ratio will become extremely great. Along with this, the amount of the $H_2$ which is contained in the exhaust gas will also increase.

On the other hand, in the present embodiment, in F/B control of the air-fuel ratio, the output value of the air-fuel ratio sensor 22 is used. However, this air-fuel ratio sensor 22 has a high sensitivity to $H_2$. For this reason, if the $H_2$ concentration in the exhaust gas is high, the output value of the air-fuel ratio sensor 22 will tend to deviate to the rich side.

Even if the output value of the air-fuel ratio sensor 22 deviates in this way, if not using the variable compression ratio mechanism A, the ratio of the $H_2$ which is contained in the exhaust gas will be constantly substantially uniform, and therefore the extent of the deviation of the output value of the air-fuel ratio sensor 22 will be constantly substantially uniform, so certain correction can be applied in advance to suitably compensate for this. However, if using the variable compression ratio mechanism A, the ratio of the $H_2$ which is contained in the exhaust gas will change in accordance with the mechanical compression ratio, that is, in accordance with the S/V ratio, so even if certain correction is performed, suitable compensation is not possible.

Further, in an ordinary internal combustion engine, the amount of $H_2$ which is contained in the exhaust gas is not that great, therefore the deviation of the output value of the air-fuel ratio sensor 22 also is of a negligible extent. However, in a spark ignition type internal combustion engine where the mechanical compression ratio is a high compression ratio of 20 or more, the S/V ratio sometimes becomes extremely great. Along with this, the ratio of the $H_2$ which is contained in the exhaust gas also becomes higher. For this reason, the output value of the air-fuel ratio sensor 22 greatly deviates to the rich side to a non-negligible extent and the air-fuel ratio of the exhaust gas can no longer be accurately detected. As a result, the air-fuel ratio can no longer be suitably controlled, and deterioration of the combustion efficiency and deterioration of the exhaust emission are sometimes invited.

Therefore, in a first embodiment of the present invention, the target air-fuel ratio is controlled in accordance with the mechanical compression ratio.

Figure 12:
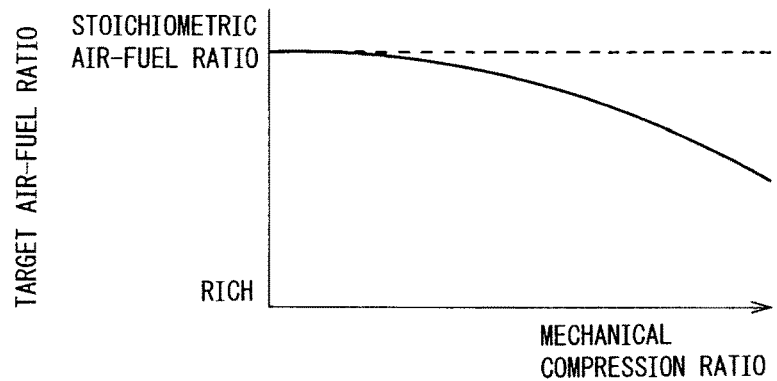
FIG. 12 is a view showing the relationship between the mechanical compression ratio and target air-fuel ratio.

FIG. 12 is a view showing the relationship between the mechanical compression ratio and the target air-fuel ratio. As will be understood from FIG. 12, the target air-fuel ratio is set low (to the rich side) when the mechanical compression ratio is high, compared to when it is low. In more detail, as the mechanical compression ratio becomes higher, the target air-fuel ratio is set lower. In other words, in the present embodiment, as the S/V ratio becomes higher, the target air-fuel ratio is set lower.

Here, in the above-mentioned way, the amount of $H_2$ which is contained in the exhaust gas increases as the mechanical compression ratio becomes higher. Further, the more the amount of $H_2$ which is contained in the exhaust gas, the greater the extent by which the output value of the air-fuel ratio sensor 22 deviates to the rich side. Therefore, as the mechanical compression ratio becomes higher, the extent by which the output value of the air-fuel ratio sensor 22 deviates to the rich side becomes larger.

In the present embodiment, as the mechanical compression ratio becomes higher, the target air-fuel ratio is set to the rich side. Therefore, even if the mechanical compression ratio becomes higher and the output value of the air-fuel ratio sensor 22 deviates to the rich side, the target air-fuel ratio is set to the rich side by exactly that amount, so as a result the air-fuel ratio of the exhaust gas is F/B controlled to become the actual target air-fuel ratio (that is stoichiometric air-fuel ratio). That is, according to the present embodiment, the target air-fuel ratio is corrected by exactly the amount of the deviation occurring in the output value of the air-fuel ratio sensor 22 due to the mechanical compression ratio becoming higher, whereby the deviation occurring in the output value of the air-fuel ratio sensor 22 is compensated for. In other words, in the present embodiment, it can be said that the effect of the $H_2$ concentration changing due to a change in the mechanical compression ratio is made smaller by correcting a parameter relating to operation of the internal combustion engine, that is, the target air-fuel ratio.

Further, in the first embodiment according to the present invention, the target air-fuel ratio is controlled in accordance with the closing timing of the intake valve 7.

Figure 13:
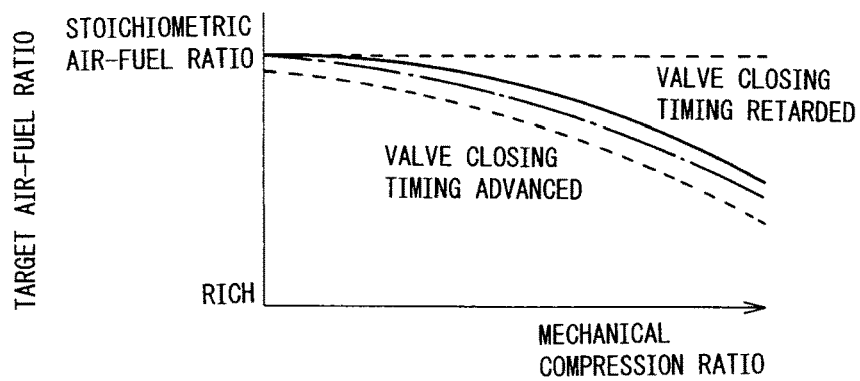
FIG. 13 is a view showing the relationship between the mechanical compression ratio and target air-fuel ratio.

FIG. 13 is a view showing the relationship between the mechanical compression ratio and the target air-fuel ratio. The solid line in the figure shows the case where the closing timing of the intake valve 7 is set to the retarded side, the broken line in the figure shows the case where the closing timing of the intake valve 7 is set to the advanced side, and the one-dot chain line in the figure shows the case where the closing timing of the intake valve 7 is set to a medium extent of timing. As will be understood from FIG. 13, the target air-fuel ratio is set lower (to the rich side) when the closing timing of the intake valve 7 is at the advanced side, compared to when it is at the retarded side. In more detail, as the closing timing of the intake valve 7 becomes advanced, the target air-fuel ratio is set lower.

In this regard, if the closing timing of the intake valve 7 is advanced, the actual compression action is started earlier and, as a result, the actual compression ratio becomes higher. If the actual compression ratio becomes higher, the density of the air-fuel mixture in a combustion chamber 5 when the piston is positioned at compression top dead center becomes higher. For this reason, the amount of HC which is present in the quench region increases and therefore the amount of $H_2$ which is generated inside of the combustion chamber 5 also increases. If the amount of $H_2$ increases in this way, the deviation which occurs at the air-fuel ratio sensor 22 also becomes larger. Summarizing the above, if the closing timing of the intake valve 7 is advanced, the deviation which occurs in the air-fuel ratio sensor 22 becomes larger.

Here, in the present embodiment, as the closing timing of the intake valve 7 is advanced, the target air-fuel ratio is set to the rich side. Therefore, even if the closing timing of the intake valve 7 is advanced and the output value of the air-fuel ratio sensor 22 deviates to the rich side, the target air-fuel ratio is set to the rich side by exactly that amount, so as a result, the air-fuel ratio of the exhaust gas is F/B controlled to become the actual target air-fuel ratio (that is, stoichiometric air-fuel ratio). That is, according to the present embodiment, the target air-fuel ratio is corrected by exactly the amount of deviation of the output value of the air-fuel ratio sensor 22 due to the closing timing of the intake valve 7 being advanced, whereby the deviation which occurs in the output value of the air-fuel ratio sensor 22 is compensated for. In other words, in the present embodiment, it can be said that a parameter relating to operation of the internal combustion engine, that is, the target air-fuel ratio, is corrected so that the effect of the $H_2$ concentration changing due to a change in the closing timing of the intake valve 7 is made smaller.

Furthermore, in the first embodiment according to the present invention, the target air-fuel ratio is controlled in accordance with the opening degree of the EGR valve 24.

Figure 14:
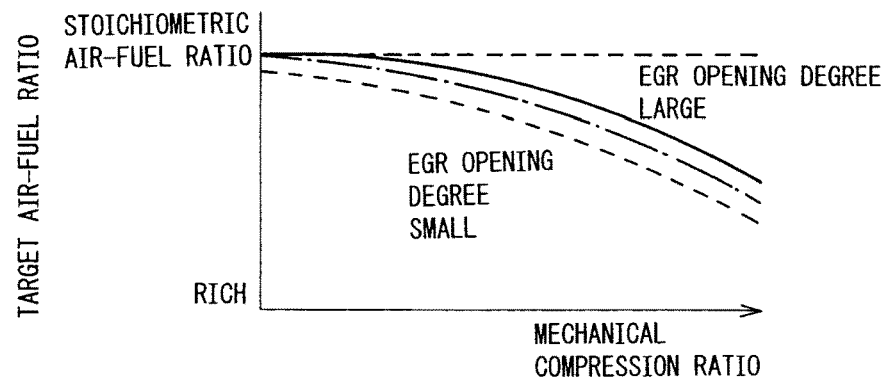
FIG. 14 is a view showing the relationship between the mechanical compression ratio and target air-fuel ratio.

FIG. 14 is a view showing the relationship between the mechanical compression ratio and the target air-fuel ratio. The solid line in the figure shows the case where the opening degree of the EGR valve 24 is large, the broken line in the figure shows the case where the opening degree of the EGR valve is small, and the one-dot chain line in the figure shows the case where the opening degree of the EGR valve 24 is the medium extent. As will be understood from FIG. 14, the target air-fuel ratio is set lower (to the rich side) when the opening degree of the EGR valve 24 is small compared to when it is large. In more detail, as the opening degree of the EGR valve 24 becomes smaller, the target air-fuel ratio is set lower.

In this regard, if the opening degree of the EGR valve 24 is made larger, the amount of the EGR gas which is fed into the combustion chamber 5 is increased. If the amount of the EGR gas which is fed into the combustion chamber 5 in this way is increased, relatively, the amount of the air-fuel mixture of the air and fuel which are fed into the combustion chamber 5 is decreased and the density of the air-fuel mixture in the combustion chamber 5 falls. For this reason, the amount of HC which is present in the quench region decreases and therefore the amount of $H_2$ which is generated in the combustion chamber 5 also decreases. If the amount of $H_2$ is decreased in this way, the deviation which occurs in the air-fuel ratio sensor 22 will become smaller. Summarizing the above, if the opening degree of the EGR valve 24 is made larger, the deviation which occurs in the air-fuel ratio sensor 22 will become smaller. Conversely speaking, if the opening degree of the EGR valve 24 is made smaller, the deviation in the air-fuel ratio sensor 22 will become larger.

Here, in the present embodiment, as the opening degree of the EGR valve 24 becomes smaller, the target air-fuel ratio is set to the rich side. Therefore, even if the opening degree of the EGR valve 24 is made smaller and the output value of the air-fuel ratio sensor 22 deviates to the rich side, the target air-fuel ratio is set to the rich side by that amount, so as a result, the air-fuel ratio of the exhaust gas is F/B controlled to become the actual target air-fuel ratio (that is, stoichiometric air-fuel ratio). That is, according to the present embodiment, the target air-fuel ratio is corrected by exactly the amount of the deviation occurring in the output value of the air-fuel ratio sensor 22 due to the opening degree of the EGR valve 24 being made smaller, whereby the deviation occurring in the output value of the air-fuel ratio sensor 22 is compensated for. In other words, in the present embodiment, it can be said that a parameter relating to operation of the internal combustion engine, that is, the target air-fuel ratio is corrected so that the effect of the $H_2$ concentration changing due to a change in the opening degree of the EGR valve 24 is made smaller.

Note that, in the above embodiment, in performing F/B control, the air-fuel ratio sensor 22 is used. However, instead of the air-fuel ratio sensor 22, it is also possible to use an oxygen sensor to perform the F/B control. Further, an oxygen sensor, like an air-fuel ratio sensor 22, is high in sensitivity to $H_2$. Therefore, instead of an air-fuel ratio sensor 22, an oxygen sensor may also be used, and in this case as well, control is performed similar to the case of using the above air-fuel ratio sensor 22.

Further, in addition to an air-fuel ratio sensor or oxygen sensor, there are sensors with high sensitivity to $H_2$. As an example of such a sensor, for example, an $NO_X$ sensor which detects the concentration of $NO_X$ in the exhaust gas may be mentioned. With an $NO_X$ sensor, the higher the $H_2$ concentration in the exhaust gas, the lower the $NO_X$ concentration tends to be detected as.

Therefore, when using the output value of an $NO_X$ sensor as the basis to control the internal combustion engine, the parameter relating to the operation of the internal combustion engine is corrected so that operational control of the internal combustion engine, which is performed when the $NO_X$ concentration is higher than the $NO_X$ concentration which is detected by the $NO_X$ sensor, is performed more the higher the mechanical compression ratio. For example, when the mechanical compression ratio is high, the target air-fuel ratio is corrected lower (to the rich side) or correction is performed so that the frequency of execution of rich spike control for temporarily making the exhaust air-fuel ratio rich is increased.

Summarizing these, in the embodiment of the present invention, it can be said that a parameter relating to operation of the internal combustion engine is corrected in accordance with the mechanical compression ratio so that the effect of the $H_2$ concentration in the exhaust gas, which increases along with an increase in the mechanical compression ratio, is made smaller.

Note that, in the above embodiment, the target air-fuel ratio is controlled in accordance with the mechanical compression ratio. However, if the S/V ratio is changed, the concentration of $H_2$ in the exhaust gas will change and a similar problem will occur, so the above-mentioned control is not limited to a variable compression ratio mechanism A and can also be applied to an internal combustion engine which has an S/V ratio changing mechanism which can change the S/V ratio.

Further, in the above embodiment, as the exhaust purification catalyst, a three-way catalyst is used, but it is also possible to use an $NO_X$ storage reduction catalyst or other exhaust purification catalyst. Further, in the above embodiment, the target air-fuel ratio is made the stoichiometric air-fuel ratio, but the target air-fuel ratio need not necessarily be the stoichiometric air-fuel ratio. For example, the target air-fuel ratio is made an air-fuel ratio at the lean side from the stoichiometric air-fuel ratio.

Figure 16A:
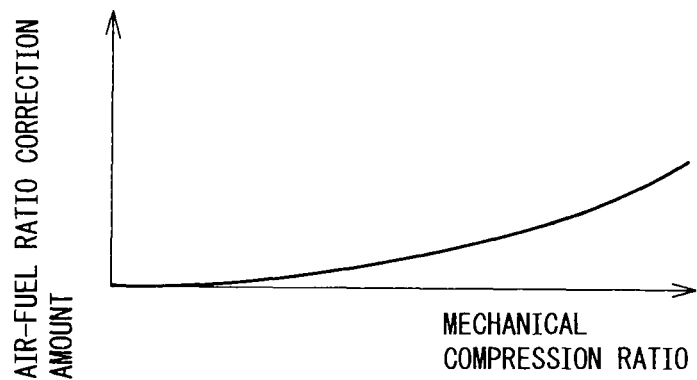
FIG. 16A to FIG. 16C are views showing maps of the different parameters and the amount of correction of the target air-fuel ratio.
Figure 16B:
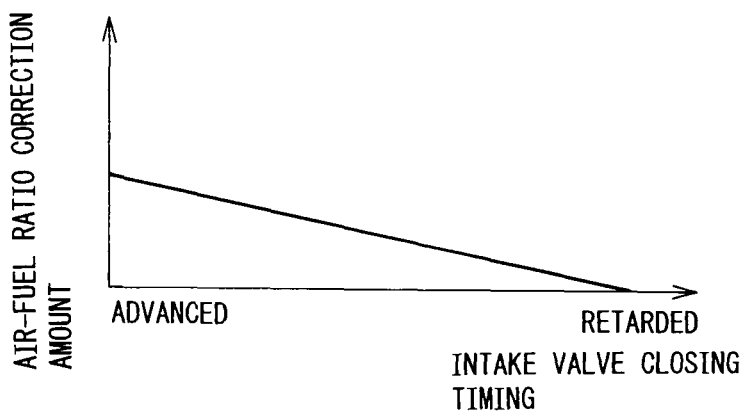
Figure 16C:
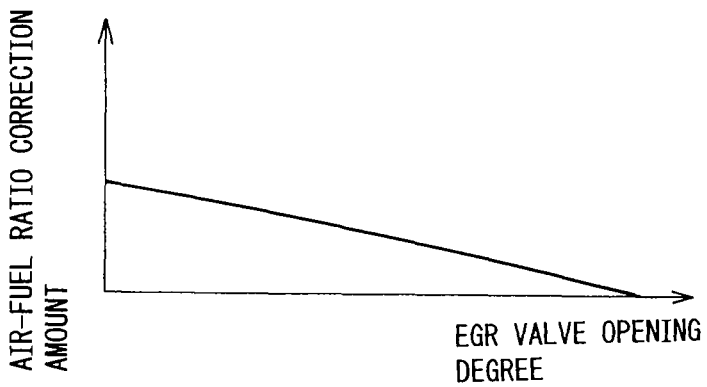

FIG. 15 is a flowchart showing the control routine of control for setting the target air-fuel ratio. As shown in FIG. 15, first, at step S31, the mechanical compression ratio is detected. Next, at step S32, the closing timing of the intake valve 7 is detected. Next, at step S33, the opening degree of the EGR valve 24 is detected. At step S34, the amount of correction kεm of the target air-fuel ratio based on the mechanical compression ratio is calculated based on the mechanical compression ratio which was detected at step S31 and by using a map such as shown in FIG. 16A. Next, at step S35, the amount of correction kivc of the target air-fuel ratio based on the intake valve closing timing is calculated based on the closing timing of the intake valve 7 which was detected at step S32 and by using a map such as shown in FIG. 16B. At step S36, the amount of correction kegr of the target air-fuel ratio based on the EGR valve opening degree is calculated based on the opening degree of the EGR valve 24 which was detected at step S33 and by using a map such as shown in FIG. 16C. Next, at step S37, the value of the actual target air-fuel ratio AFTbase minus the amount of correction which was calculated at step S34 to step S36 is made the target air-fuel ratio AFT. The target air-fuel ratio AFT which was calculated in this way is used at step S13 of FIG. 10.

Note that, in the above embodiment, the amount of correction of the target air-fuel ratio is calculated based on the closing timing of the intake valve 7 and the opening degree of the EGR valve 24. However, it is also possible to calculate the correction coefficient of the target air-fuel ratio based on the closing timing of the intake valve 7 and the opening degree of the EGR valve 24 and multiply the correction coefficient which was calculated in this way with the amount of correction of the target air-fuel ratio which was calculated based on the mechanical compression ratio.

Next, the control system of an internal combustion engine according to a second embodiment of the present invention will be explained. The configuration of the control system of an internal combustion engine of the second embodiment is basically the same as the configuration of the control system of an internal combustion engine of the first embodiment. However, in the control system of an internal combustion engine of the first embodiment, the value of a parameter relating to operation of the internal combustion engine is changed in accordance with the mechanical compression ratio etc., while in a control system of an internal combustion engine of the second embodiment, the output value of the detection device is corrected in accordance with the mechanical compression ratio etc.

Figure 17:
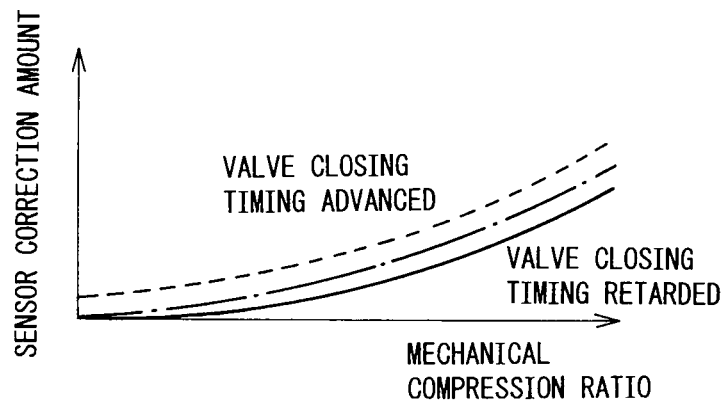
FIG. 17 is a view showing the relationship between the mechanical compression ratio and the amount of correction of the output value of the air-fuel ratio sensor to the lean side.

FIG. 17 is a view showing the relationship between the mechanical compression ratio and the amount of correction of the output value of the air-fuel ratio sensor 22 to the lean side. The solid line in the figure shows the case where the closing timing of the intake valve 7 is set to the retarded side, the broken line in the figure shows the case where the closing timing of the intake valve 7 is set to the advanced side, and the one-dot chain line in the figure shows the case where the closing timing of the intake valve 7 is set to a medium extent of timing.

As will be understood from FIG. 17, when the mechanical compression ratio is high, compared to when it is low, the amount of correction of the air-fuel ratio sensor 22 to the lean side is made larger. In more detail, as the mechanical compression ratio becomes higher, the amount of correction of the air-fuel ratio sensor 22 to the lean side is made larger. In other words, in the present embodiment, as the S/V ratio becomes higher, the amount of correction of the air-fuel ratio sensor 22 to the lean side is made larger.

According to the present embodiment, even if the mechanical compression ratio becomes higher and the output value of the air-fuel ratio sensor 22 deviates to the rich side, the output value of the air-fuel ratio sensor 22 is set to the lean side by exactly that amount, so as a result the corrected output value of the air-fuel ratio sensor 22 shows the actual air-fuel ratio of the exhaust gas. That is, according to the present embodiment, the output value of the air-fuel ratio sensor 22 is corrected by exactly the amount of the deviation occurring in the output value of the air-fuel ratio sensor 22 due to the mechanical compression ratio becoming higher, whereby the deviation occurring in the output value of the air-fuel ratio sensor 22 is compensated for. In other words, in the present embodiment, it can be said that the output value of a detection device which changes in accordance with the $H_2$ concentration is corrected so that the effect of the $H_2$ concentration, which changes due to a change in the mechanical compression ratio, is made smaller.

Further, as will be understood from FIG. 17, the amount of correction of the air-fuel ratio sensor 22 to the lean side is made larger when the closing timing of the intake valve 7 is at the advanced side, compared to when it is at the retarded side. In more detail, as the closing timing of the intake valve 7 becomes more advanced, the amount of correction of the air-fuel ratio sensor 22 to the lean side is made larger.

According to the present embodiment, even if the closing timing of the intake valve 7 is advanced and the output value of the air-fuel ratio sensor 22 deviates to the rich side, the output value of the air-fuel ratio sensor 22 is corrected to the lean side by exactly that amount, so as a result the corrected output value of the air-fuel ratio sensor 22 shows the actual air-fuel ratio of the exhaust gas. That is, according to the present embodiment, the output value of the air-fuel ratio sensor 22 is corrected by exactly the amount of the deviation occurring in the output value of the air-fuel ratio sensor 22 due to the closing timing of the intake valve 7 being advanced, whereby the deviation occurring in the output value of the air-fuel ratio sensor 22 is compensated for. In other words, in the present embodiment, it can be said that the output value of a detection device which changes in accordance with the $H_2$ concentration is corrected so that the effect of the $H_2$ concentration changing due to a change in the closing timing of the intake valve 7 is made smaller.

Further, it is also possible to increase the amount of correction of the air-fuel ratio sensor 22 to the lean side when the opening degree of the EGR valve 24 is small, compared to when it is large. In this case, in more detail, as the opening degree of the EGR valve 24 becomes smaller, the amount of correction of the air-fuel ratio sensor 22 to the lean side is made larger. Due to this, even if the opening degree of the EGR valve 24 is made smaller and the output value of the air-fuel ratio sensor 22 deviates to the rich side, the output value of the air-fuel ratio sensor 22 will be corrected to the lean side by exactly that amount, so the corrected output value of the air-fuel ratio sensor 22 will show the actual air-fuel ratio of the exhaust gas.

Note that, in the present embodiment as well, in the same way as the above first embodiment, similar control may be performed even when using an oxygen sensor or $NO_X$ sensor instead of the air-fuel ratio sensor 22. Therefore, summarizing these, it can be said that, in the embodiment of the present invention, the output value (that is, the concentration of the specific ingredient in the exhaust gas) of a detection device for detecting the concentration of a specific ingredient in the exhaust gas and changing in output value in accordance with the concentration of hydrogen in the exhaust gas is corrected in accordance with the mechanical compression ratio.

Next, a control system of an internal combustion engine of a third embodiment according to the present invention will be explained. The configuration of the control system of an internal combustion engine of the third embodiment according to the present invention is basically the same as the configuration of the control system of an internal combustion engine of the second embodiment. However, in the control system of an internal combustion engine of the present embodiment, the output value of the air-fuel ratio sensor 22 is corrected in accordance with the target air-fuel ratio.

In this regard, in the internal combustion engine of the above embodiment, the target air-fuel ratio is made substantially constant at the stoichiometric air-fuel ratio. As opposed to this, in the internal combustion engine of the present embodiment, the target air-fuel ratio can be changed in accordance with the engine operating state. For example, in the present embodiment, as the exhaust purification catalyst, an $NO_X$ storage reduction catalyst is used, the target air-fuel ratio is made lean at the time of normal operation, and the target air-fuel ratio is made rich when making the $NO_X$ which is stored in the $NO_X$ storage reduction catalyst be desorbed. In this way, for an internal combustion engine in which the target air-fuel ratio changes in accordance with the engine operating state, in a control system of an internal combustion engine of the third embodiment, the amount of correction of the air-fuel ratio sensor 22 to the lean side is made to change in accordance with the target air-fuel ratio.

Figure 18:
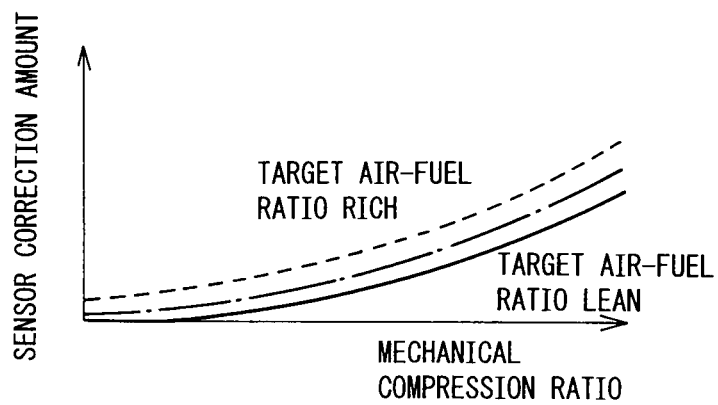
FIG. 18 is a view showing the relationship between the mechanical compression ratio and the amount of correction of the output value of the air-fuel ratio sensor to the lean side.

FIG. 18 is a view showing the relationship between the mechanical compression ratio and the amount of correction of the output value of the air-fuel ratio sensor 22 to the lean side. The solid line in the figure shows the case where the target air-fuel ratio is set to the lean side, the broken line in the figure shows the case where the target air-fuel ratio is set to the rich side, and the one-dot chain line in the figure shows the case where the target air-fuel ratio is set to substantially the stoichiometric air-fuel ratio.

As will be understood from FIG. 18, the amount of correction of the air-fuel ratio sensor 22 to the lean side is made larger when the target air-fuel ratio is low (is at the rich side), compared to when it is high (is at the lean side). More specifically, as the target air-fuel ratio becomes lower, the amount of correction of the air-fuel ratio sensor 22 to the lean side is made larger.

Here, if the air-fuel ratio of the air-fuel mixture in the combustion chamber 5 becomes lower, the HC concentration in the air-fuel mixture is increased. If the HC concentration in the air-fuel mixture becomes high, the amount of HC present in the quench region increases and therefore the amount of $H_2$ which is generated in the combustion chamber 5 also increases. If the amount of $H_2$ increases in this way, the deviation which occurs at the air-fuel ratio sensor 22 becomes larger. Summarizing the above, if the air-fuel ratio of the air-fuel mixture in the combustion chamber 5 becomes lower, the output value of the air-fuel ratio sensor 22 deviates to the rich side.

Here, in the present embodiment, as the target air-fuel ratio becomes lower, the amount of correction of the air-fuel ratio sensor 22 to the lean side is made larger. For this reason, even if the target air-fuel ratio becomes lower and the output value of the air-fuel ratio sensor 22 deviates to the rich side, the output value of the air-fuel ratio sensor 22 will be corrected to the lean side by exactly that amount, so as a result, the corrected output value of the air-fuel ratio sensor 22 will show the actual air-fuel ratio of the exhaust gas. That is, according to the present embodiment, by the output value of the air-fuel ratio sensor 22 being corrected by exactly the amount of deviation occurring in the output value of the air-fuel ratio sensor 22 due to the target air-fuel ratio becoming lower, the deviation occurring in the output value of the air-fuel ratio sensor 22 is compensated for. In other words, in the present embodiment, it can be said that the output value of a detection device with an output value which changes in accordance with the $H_2$ concentration is corrected so that the effect of the $H_2$ concentration, which changes by changing the target air-fuel ratio, is made smaller.

Figure 19:
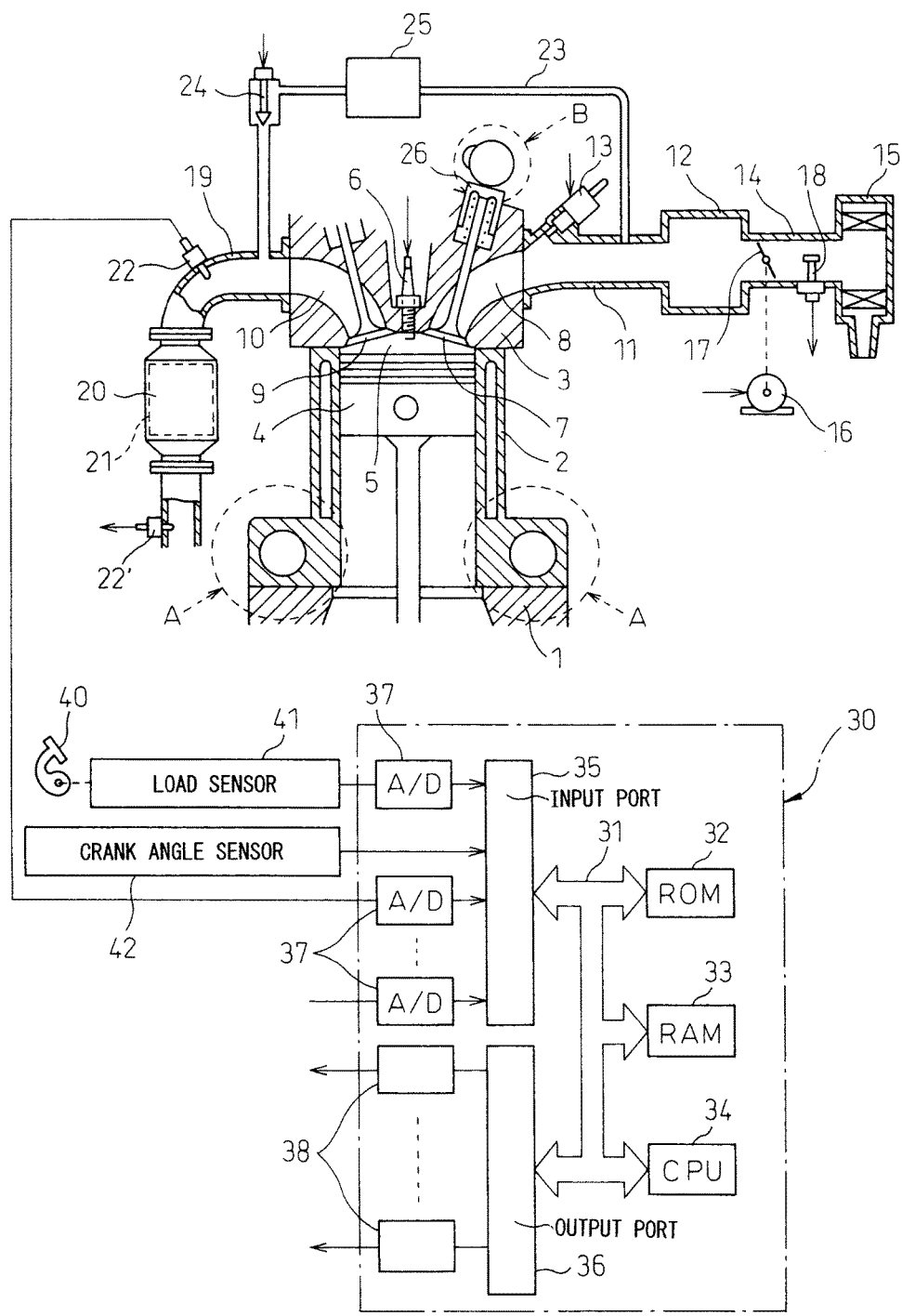
FIG. 19 is an overview of a spark ignition type internal combustion engine of a fourth embodiment.

Next, a control system of an internal combustion engine of a fourth embodiment according to the present invention will be explained. The control system of an internal combustion engine of the fourth embodiment, as shown in FIG. 19, is provided with not only the air-fuel ratio sensor 22 which is arranged at an exhaust upstream side of the three-way catalyst 21, but also an oxygen sensor 22' which is arranged at an exhaust downstream side of the three-way catalyst 21.

In this regard, sometimes the heat of the exhaust gas causes the air-fuel ratio sensor 22 to degrade and thereby deviation to occur in the output value of the air-fuel ratio sensor 22. If deviation occurs in the output value of the air-fuel ratio sensor 22 in this way, the air-fuel ratio sensor 22 will for example generate an output voltage, which originally should be generated when the exhaust air-fuel ratio becomes the stoichiometric air-fuel ratio, when the ratio is leaner than the stoichiometric air-fuel ratio. Therefore, in the present embodiment, sub F/B control using the downstream side oxygen sensor 22' is used to compensate for deviation occurring in the output value of the air-fuel ratio sensor 22 and make the output value of the air-fuel ratio sensor 22 become a value which corresponds to the actual exhaust air-fuel ratio.

That is, the oxygen sensor 22' can detect if the exhaust air-fuel ratio is richer or leaner than the stoichiometric air-fuel ratio. When the actual exhaust air-fuel ratio becomes lean, the output voltage of the oxygen sensor 24 becomes a low value, while when the actual exhaust air-fuel ratio becomes rich, the output voltage of the oxygen sensor 24 becomes a high value. Therefore, when the actual exhaust air-fuel ratio has become the substantially stoichiometric air-fuel ratio, that is, when it repeatedly rises and falls near the stoichiometric air-fuel ratio, the output voltage of the oxygen sensor 22' repeatedly inverts between a high value and a low value. From this viewpoint, in the present embodiment, the output value of the air-fuel ratio sensor 22 is corrected so that the output voltage of the oxygen sensor 22' repeatedly inverts between a high value and a low value.

FIG. 20 is a time chart of the actual exhaust air-fuel ratio, the output value of the oxygen sensor, and the output correction value efsfb of the air-fuel ratio sensor 22. The time chart of FIG. 20 shows the state where, in spite of the actual exhaust air-fuel ratio being controlled to become the stoichiometric air-fuel ratio, deviation occurs in the air-fuel ratio sensor 22 and the actual exhaust air-fuel ratio does not become the stoichiometric air-fuel ratio and in that case the deviation which occurs in the air-fuel ratio sensor 22 is compensated for.

In the example shown in FIG. 20, at the time $t_0$, the actual exhaust air-fuel ratio does not become the stoichiometric air-fuel ratio, but becomes leaner than the stoichiometric air-fuel ratio. This is because when deviation occurs in the air-fuel ratio sensor 22 and then the actual exhaust air-fuel ratio becomes an air-fuel ratio which is leaner than the stoichiometric air-fuel ratio, the air-fuel ratio sensor 22 outputs an output value corresponding to the stoichiometric air-fuel ratio. At this time, the output value of the oxygen sensor 22' becomes a low value.

The output correction value efsfb of the air-fuel ratio sensor 22 is a correction value which is added to the output value VAF which is calculated at step S22 of FIG. 11. At step S23 of FIG. 11, the output value VAF which was calculated at step S22 is increased by this output correction value efsfb and the result is used as the basis for calculation of the actual air-fuel ratio AFR(n). Therefore, when this output correction value efsfb is a positive value, the output value of the air-fuel ratio sensor 22 is corrected to the lean side, while when it is a negative value, the output value of the air-fuel ratio sensor 22 is corrected to the rich side. Further, the larger the absolute value of the output correction value efsfb, the greater the output value of the air-fuel ratio sensor 22 is corrected.

When, despite the output value of the air-fuel ratio sensor 22 being substantially the stoichiometric air-fuel ratio, the output value of the oxygen sensor 22' becomes a low value, this means that the output value of the air-fuel ratio sensor 22 deviates to the rich side. Therefore, in the present embodiment, when the output value of the oxygen sensor 22' is a low value, as shown in FIG. 20, the value of the output correction value efsfb is increased to correct the output value of the air-fuel ratio sensor 22 to the lean side. On the other hand, when, despite the output value of the air-fuel ratio sensor 22 being substantially the stoichiometric air-fuel ratio, the output value of the oxygen sensor 22' becomes a high value, the value of the output correction value efsfb is decreased to correct the output value of the air-fuel ratio sensor 22 to the rich side.

Specifically, the value of the output correction value efsfb is calculated by the following formula (4). Note that, in the following formula (4), efsfb(n−1) shows the output correction value of the n−1st time, that is, the time of the previous calculation, Ksp shows the proportional gain, and Ksi shows the integral gain. Further, ΔVO(n) shows the output difference between the output value of the oxygen sensor 22' at the time of the n-th calculation and the target output value (in the present embodiment, the stoichiometric air-fuel ratio, that is).

$$efsfb(n) = efsfb(n-1) + Ksp \cdot \Delta VO(n) + Ksi \cdot \sum_{k=1}^{n} \Delta VO(k) \quad (4)$$

In this way, in the example shown in FIG. 20, as the value of the output correction value efsfb of the air-fuel ratio sensor 22 increases, the deviation occurring in the output value of the air-fuel ratio sensor 22 is corrected and the actual exhaust air-fuel ratio gradually approaches the stoichiometric air-fuel ratio.

In this regard, the $H_2$ which is contained in the exhaust gas which is exhausted from the combustion chamber 5 is burned inside the three-way catalyst 21, so the exhaust gas which flows through the exhaust downstream side of the three-way catalyst 21 does not contain much $H_2$ at all. On the other hand, in the above-mentioned way, the oxygen sensor 22' is arranged at the exhaust downstream side of the three-way catalyst 21. For this reason, the oxygen sensor 22' is hardly affected by the $H_2$ in the exhaust gas. Therefore, even if the exhaust gas which is exhausted from the combustion chamber 5 contains $H_2$, the oxygen sensor 22' can detect the oxygen concentration relatively accurately. For this reason, even if deviation occurs in the output value of the upstream side air-fuel ratio sensor 22, by performing sub F/B control based on the output value of the downstream side oxygen sensor 22', it is possible to compensate for deviation of the output value of the upstream side air-fuel ratio sensor 22 to a certain extent.

However, the sub F/B control based on the output value of the downstream side oxygen sensor 22' is slow in response speed compared with the speed of change of the mechanical compression ratio etc. Even if the mechanical compression ratio etc. changes, it takes time to compensate for deviation of the output value of the air-fuel ratio sensor 22 by the sub F/B control. For this reason, the above sub F/B control cannot be used to swiftly compensate for deviation of the output value of the air-fuel ratio sensor 22.

Therefore, in the present embodiment, in sub F/B control, in addition to the above-mentioned output correction value efsfb, a padding correction value efsfbh which is calculated based on the mechanical compression ratio etc. is calculated, and these output correction value efsfb and padding correction value efsfbh are added to the output value VAF which was calculated at step S22 of FIG. 11.

FIG. 21 is a view showing the relationship between the mechanical compression ratio and the padding correction value efsfbh. The solid line in the figure shows the case where the closing timing of the intake valve 7 is set to the retarded side, the broken line in the figure shows the case where the closing timing of the intake valve 7 is set to the advanced side, and the one-dot chain line in the figure shows the case where the closing timing of the intake valve 7 is set to a medium extent of timing.

As will be understood from FIG. 21, the padding correction value efsfbh is made larger when the mechanical compression ratio is high, compared to when it is low. In more detail, as the mechanical compression ratio becomes higher, the padding correction value efsfbh is made larger. In other words, in the present embodiment, as the S/V ratio becomes higher, the padding correction value efsfbh is made larger.

According to the present embodiment, even if the mechanical compression ratio becomes higher and the output value of the air-fuel ratio sensor 22 deviates to the rich side, the padding correction value efsfbh is made larger by exactly that amount and the amount of correction of the output value of the air-fuel ratio sensor 22 by sub F/B control is increased, so as a result the corrected output value of the air-fuel ratio sensor 22 will show the actual exhaust gas air-fuel ratio. Further, the padding correction value efsfbh changes in accordance with the mechanical compression ratio, so it is possible to quickly respond to changes in the mechanical compression ratio. That is, according to the present embodiment, sub F/B control is used for swift correction by exactly the amount of deviation which occurs in the output value of the air-fuel ratio sensor 22 due to the mechanical compression ratio becoming higher, whereby the deviation which occurs in the output value of the air-fuel ratio sensor 22 is compensated for.

Further, as will be understood from FIG. 21, when the closing timing of the intake valve 7 is at the advanced side, compared to when it is at the retarded side, the padding correction value efsfbh is made larger. In more detail, as the closing timing of the intake valve 7 is advanced, the padding correction value efsfbh is made larger.

According to the present embodiment, even if the closing timing of the intake valve 7 is advanced and the output value of the air-fuel ratio sensor 22 deviates to the rich side, the padding correction value efsfbh is made larger by exactly that amount and the amount of correction of the output value of the air-fuel ratio sensor 22 by sub F/B control is increased, so as a result the output value of the air-fuel ratio sensor 22 shows the actual exhaust gas air-fuel ratio. Further, the padding correction value efsfbh changes in accordance with the closing timing of the intake valve 7, so it is possible to quickly respond to changes in the closing timing of the intake valve 7. That is, according to the present embodiment, the output value of the air-fuel ratio sensor 22 is corrected by exactly the amount of deviation which occurs in the output value of the air-fuel ratio sensor 22 due to the closing timing of the intake valve 7 being advanced, whereby the deviation which occurs in the output value of the air-fuel ratio sensor 22 is compensated for.

Further, it is also possible to increase the padding correction value efsfbh when the opening degree of the EGR valve 24 is small compared to when it is large. In this case, in more detail, the padding correction value efsfbh is made larger as the opening degree of the EGR valve 24 becomes smaller. Due to this, even if the opening degree of the EGR valve 24 is made smaller and the output value of the air-fuel ratio sensor 22 deviates to the rich side, the padding correction value efsfbh is made larger by that extent, so as a result the output value of the air-fuel ratio sensor 22 shows the actual exhaust gas air-fuel ratio.

Note that, in the above embodiment, the explanation was given of the case of arranging the air-fuel ratio sensor 22 at the upstream side of the three-way catalyst 21 and arranging the oxygen sensor 22' at the downstream side, but similar control is possible even when using an oxygen sensor at the upstream side or when using an air-fuel ratio sensor at the downstream side.

Note that, the present invention was explained in detail based on specific embodiments, but a person skilled in the art could make various changes, modifications, etc. without departing from the claims and concept of the present invention.

EXPLANATION OF REFERENCES

1 . . . crankcase
2 . . . cylinder block
3 . . . cylinder head
4 . . . piston
5 . . . combustion chamber
7 . . . intake valve
70 . . . intake valve cam shaft
A . . . variable compression ratio mechanism
B . . . variable valve timing mechanism

The invention claimed is:

1. A control system of an internal combustion engine comprising:
   an S/V ratio changing mechanism that changes an S/V ratio of a combustion chamber;
   a three-way catalyst which is arranged in an engine exhaust passage;
   an oxygen sensor or an air-fuel ratio sensor which is arranged upstream of the three-way catalyst in the engine exhaust passage, and which is to output an output value that changes in accordance with a hydrogen concentration in an exhaust gas which increases along with an increase in the S/V ratio; and
   a controller configured to control an air-fuel ratio of gas in the combustion chamber corresponding to the output value of the oxygen sensor or the air-fuel ratio sensor to a target air-fuel ratio, which is a stoichiometric air-fuel ratio,
   the controller being further configured to:
      correct the output value so as to compensate for a deviation amount between the output value and an actual air-fuel ratio of the exhaust gas, which increases as the S/V ratio increases; and
      control the air-fuel ratio of the gas in the combustion chamber based on a corrected output value, so that the actual air-fuel ratio is maintained at the target air-fuel ratio even when the S/V ratio increases.

2. The control system of the internal combustion engine as set forth in claim 1, wherein the oxygen sensor or the air-fuel ratio sensor includes an upstream side sensor which is arranged at an upstream side of the three-way catalyst and a downstream side sensor which is arranged at a downstream side of said three-way catalyst, an amount of fuel feed is corrected based on an output value of the upstream side sensor so that the actual air-fuel ratio of the exhaust gas becomes the target air-fuel ratio, when the output value of the upstream side sensor deviates from the actual air-fuel ratio of the exhaust gas, the output value of the upstream side sensor or the amount of fuel feed is corrected based on an output value of the downstream side sensor, and
   an amount of correction of the output value of the upstream side sensor or the amount of fuel feed based on the output value of the downstream side sensor is corrected in accordance with the S/V ratio of the S/V ratio changing mechanism, wherein
   each of the upstream side sensor and the downstream side sensor is an oxygen sensor or an air-fuel ratio sensor.

3. The control system of the internal combustion engine as set forth in claim 1, wherein the S/V ratio changing mechanism is a variable compression ratio mechanism which changes a mechanical compression ratio.

4. The control system of the internal combustion engine as set forth in claim 3, further comprising a variable valve timing mechanism which controls a closing timing of an intake valve, wherein an amount of intake air which is fed into the combustion chamber is mainly controlled by changing the closing timing of the intake valve, and the mechanical compression ratio is made higher at a time of engine low load operation compared with a time of engine high load operation.

5. The control system of the internal combustion engine as set forth in claim 3, wherein, at a time of engine low load operation, the mechanical compression ratio is made a maximum mechanical compression ratio.

6. The control system of the internal combustion engine as set forth in claim 3, wherein, at a time of engine low load operation, an expansion ratio is made 20 or more.

7. The control system of the internal combustion engine as set forth in claim 1, further comprising:
a variable valve timing mechanism which controls a closing timing of an intake valve; and
an EGR valve which opens and closes an EGR passage which connects an engine intake passage and the engine exhaust passage,
wherein the controller is further configured to:
calculate an amount of correction of the output value of the oxygen sensor or the air-fuel ratio sensor or the target air-fuel ratio for compensating for the deviation amount between the output value of the oxygen sensor or the air-fuel ratio sensor and the actual air-fuel ratio of the exhaust gas due to a change of the hydrogen concentration in the exhaust gas due to a change of the closing timing of the intake valve, based on the closing timing of the intake valve;
calculate an amount of correction of the output value of the oxygen sensor or the air-fuel ratio sensor or the target air-fuel ratio for compensating for the deviation amount between the output value of the oxygen sensor or the air-fuel ratio sensor and the actual air-fuel ratio of the exhaust gas due to a change of the hydrogen concentration in the exhaust gas due to a change of an opening degree of the EGR valve, based on the opening degree of the EGR valve; and
correct the output value of the oxygen sensor or the air-fuel ratio sensor or the target air-fuel ratio based on the amount of correction which is calculated on the basis of the closing timing of the intake valve, and the amount of correction which is calculated on the basis of the opening degree of the EGR valve.

8. The control system of the internal combustion engine as set forth in claim 1, wherein the S/V ratio changing mechanism includes at least one cam shaft that engages with a cylinder block that includes the combustion chamber, so that the cylinder block is movable.

* * * * *